United States Patent

Yoshida et al.

[11] Patent Number: 5,844,882
[45] Date of Patent: Dec. 1, 1998

[54] RECORDING MEDIUM, ADDRESS RECORDING METHOD AND APPARATUS, AND RECORDING/REPRODUCING METHOD AND APPARATUS FOR REDUCING CROSSTALK OF ADDRESSING SIGNALS

[75] Inventors: Tadao Yoshida; Chiaki Nonaka, both of Kanagawa, Japan

[73] Assignee: Sony Corporation, Tokyo, Japan

[21] Appl. No.: 819,427

[22] Filed: Mar. 17, 1997

[30] Foreign Application Priority Data

Mar. 25, 1996 [JP] Japan ................................ 8-067839

[51] Int. Cl.$^6$ ...................................... G11B 7/24
[52] U.S. Cl. ................................ 369/275.4; 369/275.1
[58] Field of Search .................... 369/275.4, 275.1, 369/13, 54, 32, 58, 124, 278, 275.3, 279, 59, 109, 44.29, 44.13

[56] References Cited

U.S. PATENT DOCUMENTS

| | | | |
|---|---|---|---|
| 5,023,856 | 6/1991 | Raaymakers et al. | 369/32 |
| 5,210,738 | 5/1993 | Iwata et al. | 369/275.1 |
| 5,214,631 | 5/1993 | Maeda et al. | 369/59 |
| 5,244,705 | 9/1993 | Tsurushima et al. | 428/64 |
| 5,317,553 | 5/1994 | Ohga et al. | 369/54 |
| 5,339,302 | 8/1994 | Takahashi et al. | 369/54 |
| 5,377,178 | 12/1994 | Saito et al. | 369/124 |
| 5,388,093 | 2/1995 | Yoshida et al. | 369/124 |
| 5,506,023 | 4/1996 | Ohmori et al. | 428/64.3 |
| 5,521,900 | 5/1996 | Ando et al. | 369/275.1 |
| 5,537,373 | 7/1996 | Horikiri | 369/44.13 |
| 5,537,387 | 7/1996 | Ando et al. | 369/275.1 |
| 5,552,896 | 9/1996 | Yoshida | 358/342 |

FOREIGN PATENT DOCUMENTS

0751503 A2   1/1997   European Pat. Off. .

OTHER PUBLICATIONS

Patent Abstracts of Japan, vol. 095, No. 009, JP 07161045, Published Jun. 23, 1995, Sharp Corporation.
Patent Abstracts of Japan, vol. 018 (P–1705), No. 135, JP 05314538, Published Nov. 11, 1993, Sharp Corporation.

Primary Examiner—Ali Neyzari
Attorney, Agent, or Firm—Limbach & Limbach LLP

[57] ABSTRACT

Edges on both sides of each groove on a disk 11 are wobbled to indicate the addresses of recording locations. A laser beam for detection of data is radiated to a land for recording data, forming a spot 51-1. Two laser beams for detection of a tracking error are radiated to edges on both sides of a groove in such a way that the middle between the two laser beams coincides with the center of the groove, forming spots 51-2 and 51-3. By using such a tracking-error detecting laser beam to read out address information, the laser beam can be radiated to only the edge on a predetermined side of a groove. As a result, an address can be read out with a reduced amount of crosstalk from another groove even if the track pitch is small. Address information is thus read out with a highly accurate degree even in the case of a small track pitch.

27 Claims, 16 Drawing Sheets

F I G. 3
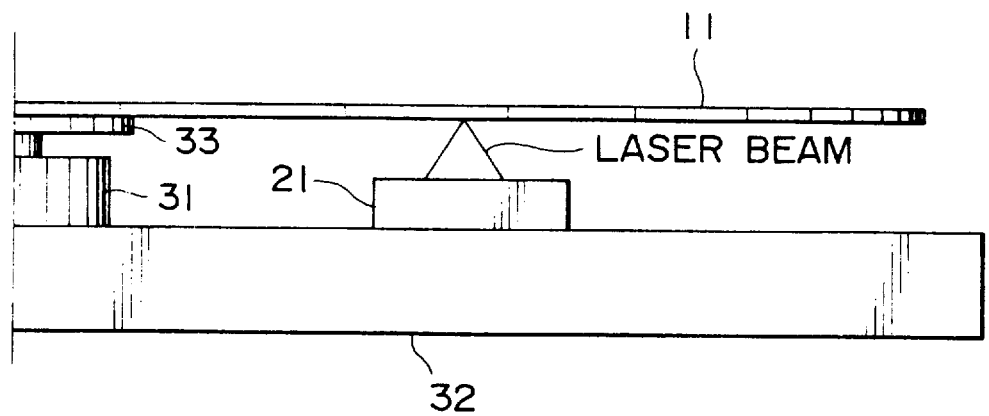

F I G. 6
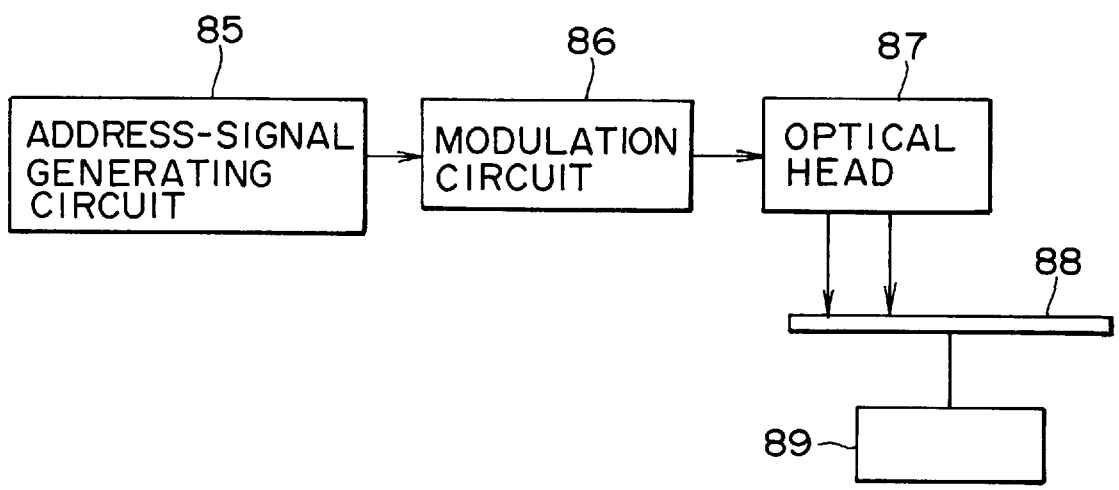

RECORDING MEDIUM, ADDRESS RECORDING METHOD AND APPARATUS, AND RECORDING/REPRODUCING METHOD AND APPARATUS FOR REDUCING CROSSTALK OF ADDRESSING SIGNALS

BACKGROUND OF THE INVENTION

1. Field of the Invention

In general, the present invention relates to a recording medium, an address recording method/apparatus and a recording-reproducing method/apparatus. In particular, the present invention relates to a recording medium having grooves each wobbled in accordance with address information, an address recording method and an address recording apparatus for recording address information by wobbling each of the grooves and a recording-reproducing method and a recording-reproducing apparatus for recording data in the recording medium having grooves each wobbled in accordance with address information.

2. Description of Related Art

With the enhancement of the performance of information equipment observed in recent years, a large amount of data can now be handled and a recording medium having a large capacity is in demand.

Attempts to increase the data recording density of data recorded in a recording medium utilizing light such as an optical disk or an optical magnetic disk are made by adopting feasible techniques of typically reducing the track pitch and increasing the data recording density in the track direction. In an optical pickup device for recording and playing back data to and from such a recording medium, the use of a laser diode for emitting a laser beam with a small wavelength and an object lens having a large NA (meaning the number of apertures) as well as the adoption of a high-resolution technique have been proposed.

In the case of an optical disk exclusively for reproducing purposes such as a compact disk (CD), it is relatively easy to reduce the track pitch and increase the data recording density in the track direction. As a result, the enhancement of the data recording density by using the technique described above is considered to be possible.

In the case of a magneto-optical disk for both recording and reproducing operations such as a mini-disk (MD-MO), on the other hand, recording methods can be classified into two main techniques, that is, an MO method and a phase-change method. In either of the methods, it is necessary to retain address information for each position on the disk by using a predetermined technique.

Most of recording media for both recording and reproducing operations have uneven surfaces on the information recording layer called grooves and lands. Cluster numbers and sector numbers indicating positions on the recording medium are modulated and the shapes of the grooves are wobbled in advance in accordance with the modulated signal. Address information is then retained in the shapes of the grooves (strictly speaking, the shapes of the edges of the grooves).

FIG. 14 is a diagram showing a typical disk with grooves thereof each wobbled as described above. In this disk, the track pitch, which is defined as a distance from the center line of a track to the center line of a track adjacent thereto, is 1.6 microns. The wobbling period of a groove is about 54 microns. Data is recorded on a groove, that is, a groove is used as a track. Address information is retained on wobbled edges on both sides of a groove.

In FIG. 14, three spots 54-1 to 54-3 of laser beams in an operation to detect a tracking error by using a three-spot technique are shown. As shown in the figure, the center spot 54-1 is located on the center line of a track. On the other hand, the spots 54-2 and 54-3 are located at positions separated away from the center line by a quarter of the track pitch toward the circumference and the center of the disk respectively. In addition, the three spots 54-1 to 54-3 are arranged in the tangential direction of the track with the spots 54-2 and 54-3 sandwiching the spot 54-1.

A returned light (a laser beam reflected by the recording medium) coming from the center spot 54-1 is used for reading out data, carrying out focus-servo control and reading out address information. On the other hand, returned lights coming from the two remaining spots 54-2 and 54-3 are used for carrying out tracking-servo control.

FIG. 15 is a diagram showing a typical circuit for detecting these three returned lights and outputting signals representing the returned lights. The returned light for reading out data, carrying out focus-servo control and reading out address information is split into two beams on its way inside an optical system. One of the beams is used for carrying out focus-servo control and reading out address information while the other one is used for reading out data. The beam for reading out data is further split into two polarization components by a polarization beam splitter.

Photo diodes 101 comprise five light receiving units 101-1 to 101-5. The light receiving units 101-1 receives one of the two beams split from the returned light coming from the center spot 54-1, which beam is used for carrying out focus-servo control and reading out address information. The polarization components of the other beam for reading out data are received by the light receiving units 101-4 and 101-5 respectively. It should be noted that, since the polarization state of the returned light for reading out data changes in accordance with data recorded on the disk, the data can be detected from a difference between the polarization components received by the light receiving units 101-4 and 101-5.

The light receiving units 101-2 and 101-3 of the photo diodes 101 are used for receiving the returned lights coming from the spots 54-2 and 54-3 respectively.

The light receiving unit 101-1 is divided into four light receiving regions A to D. On the other hand, the light receiving unit 101-2 has a light receiving region E while the light receiving unit 101-3 includes a light receiving region F. In addition, the light receiving units 101-4 and 101-5 have light receiving regions I and J respectively. The light receiving regions A to F as well as I and J each output an electrical signal representing the quantity of light received thereby.

It should be noted that, in the light receiving units 101-1 to 101-3, the returned light coming from the outer-circumference half of the spot 54-1 hits the light receiving regions A and D and the returned light coming from the outer-circumference half of the spot 54-2 hits the upper half of the light receiving region E. On the other hand, the returned light coming from the outer-circumference half of the spot 54-3 hits the upper half of the light receiving region F. By the same token, the returned light coming from the inner-circumference half of the spot 54-1 hits the light receiving regions B and C and the returned light coming from the inner-circumference half of the spot 54-2 hits the lower half of the light receiving region E. On the other hand, the returned light coming from the inner-circumference half of the spot 54-3 hits the lower half of the light receiving region F.

An adder 102 is used for adding an electrical signal output by the light receiving region A of the light receiving unit 101-1 to an electrical signal output by the light receiving region C of the same light receiving unit. The sum (A+C) resulting from the addition is supplied to a subtractor 104. By the same token, an adder 105 is used for adding an electrical signal output by the light receiving region B of the light receiving unit 101-1 to an electrical signal output by the light receiving region D of the same light receiving unit. The sum (B+D) resulting from the addition is supplied to the subtractor 104.

A subtractor 103 is used for subtracting an electrical signal output by the light receiving region J from an electrical signal output by the light receiving region I to give a difference (I−J) which is output as a data detection signal. The data detection signal is, in turn, observed in an operation to play back data recorded on a disk.

The subtractor 104 is used for subtracting the signal (B+D) output by the adder 105 from the signal (A+C) output by the adder 102 to give a difference ((A+C)−(B+D)) which is output as a focus-error signal. The focus-error signal is, in turn, used in a focus servo based on an astigmatism method.

An adder 106 is used for adding an electrical signal output by the light receiving region A of the light receiving unit 101-1 to an electrical signal output by the light receiving region D of the same light receiving unit. The sum (A+D) resulting from the addition is supplied to a subtractor 108. By the same token, an adder 107 is used for adding an electrical signal output by the light receiving region B of the light receiving unit 101-1 to an electrical signal output by the light receiving region C of the same light receiving unit. The sum (B+C) resulting from the addition (B+C) is supplied to the subtractor 108.

The subtractor 108 is used for subtracting the signal (B+C) output by the adder 107 from the signal (A+D) output by the adder 106 to give a difference ((A+D)−(B+C) which is output as a wobbling signal. The wobbling signal represents the shapes of the edges on both sides of a groove (track) wobbled in accordance with address information and is used for reading out the address information.

A subtractor 109 is used for subtracting an electrical signal output by the light receiving region F of the light receiving unit 101-3 from an electrical signal output by the light receiving region E of the light receiving unit 101-2 to give a difference (E−F) which is output as a tracking-error signal. The tracking-error signal is, in turn, used in a tracking servo adopting a three-spot technique.

As described above, a laser beam for the center spot 54-1, one of the three spots 54-1 to 54-3, is utilized for reading out data, carrying out a focus servo as well as reading out address information.

In addition to the disk shown in FIG. 14, there is also a disk used for storing and playing back data into and from both grooves and lands thereof. As shown in FIG. 16, there is also a disk in which the edge on only one side of each groove and each land, that is, a boundary edge between the groove and the land, is wobbled in accordance with the address information for the groove and the land.

In the disks described above, however, when the track pitch is reduced in order to increase the data recording density, the width of the groove and the width of a gap between two adjacent grooves also decrease as well, causing part of a laser beam for recording or playing back data into or from a track to be radiated also to a track adjacent to the track undergoing data recording or reproduction. As a result, when address information is read out by using a laser beam used for recording or playing back data, interference (or crosstalk) by the adjacent track (groove) is experienced, causing the C/N (Carrier to Noise) ratio of the address signal to deteriorate and, thus, giving rise to a problem that it is difficult to read out address information.

In the case of the disk shown in FIG. 16 in which data is recorded in both grooves and lands, when data is recorded thereto, a laser beam is also radiated to an adjacent groove or land (that is, a spot 54 shown in the figure also covers an adjacent groove or land), giving rise to a problem that data already recorded in the adjacent groove or land is prone to damages or a problem that a crosswrite is apt to occur.

SUMMARY OF THE INVENTION

The present invention addresses the problems described above. It is thus an object of the present invention to provide a recording medium, an address recording method/apparatus and a data recording-reproducing method/apparatus wherein, on both sides of a track of the recording medium which data is recorded into and played back from, non-recording areas are provided and an address-information laser beam other than a laser beam for conveying data in a recording or reproducing operation is radiated to an edge wobbled in accordance with predetermined address information in such a way that the address-information laser beam can be prevented from being radiated to an edge wobbled in accordance with address information of another track so that, even in the case of a small track pitch, crosstalk and crosswrites can be avoided, allowing address information to be read out as well as data to be recorded and played back.

According to the recording medium of the present invention, lands and grooves are laid out alternately with one of them used as a track and the other used as a non-recording area wherein right and left edges of a groove used as a non-recording area are wobbled in accordance with address information of one of right and left tracks adjacent to the non-recording area. As a result, by reading out address information through radiation of a laser beam focused on the center of a non-recording area, the laser beam is thus hardly radiated to the edges having address information of another track, allowing the track pitch to be reduced.

According to the recording medium described in claim 2, lands and grooves are laid out alternately with one of them used as a track and the other used as a non-recording area wherein an edge on one side of a first groove used as a recording area and an edge on a first-groove side of a second groove adjacent to the side of the first groove are wobbled in accordance with address information of the first groove used as a track. As a result, by reading out address information through radiation of a laser beam focused on the center of a land used as a non-recording area, the laser beam is therefore hardly radiated to the edges having address information of another track, allowing the track pitch to be reduced.

According to address recording methods of the present invention, by wobbling right and left edges of a groove used as a non-recording area, address information of one of right and left tracks adjacent to the non-recording area can be recorded. As a result, it is possible to make a recording medium with a small track pitch.

According to a recording/reproducing method of the present invention and a recording/reproducing apparatus of the present invention, a first beam for recording or playing back data is radiated to a track and a second beam is radiated to edges sandwiching a non-recording area of a recording medium, being focused on the non-recording area;

a reflected light of the second beam radiated to the edges sandwiching the non-recording area and focused on the non-recording area coming from the recording medium is detected; and the address of a location hit by the first radiated beam is calculated from the reflected light of the second radiated beam.

As a result, the laser beam is therefore hardly radiated to an edge having address information of another track, allowing address information to be read out with a reduced amount of crosstalk even in the case of a small track pitch.

According to a recording medium of the present invention, lands and grooves are laid out alternately with one of them used as a track and the other used as a non-recording area wherein either one of left and right edges of a groove is wobbled in accordance with address information of a track adjacent to the edge. As a result, when a laser beam is radiated to the wobbled edge, the laser beam is therefore hardly radiated to an edge having address information of another track, allowing the track pitch to be reduced.

According to a recording/reproducing method of the present invention and a recording/reproducing apparatus of the present invention, a first beam for recording or playing back data is radiated to a track and a second beam is radiated to an area centering on an edge;

a reflected light of the second beam radiated to an area centering on the edge coming from the recording medium is detected; and the address of a location hit by the first radiated beam is calculated from the reflected light of the second radiated beam.

As a result, the laser beam is therefore hardly radiated to an edge having address information of another track, allowing address information to be read out with a reduced amount of crosstalk even in the case of a small track pitch.

According to a recording/reproducing method of the present invention and a recording/reproducing apparatus of the present invention, a first beam for recording or playing back data is radiated to a track and a second beam is radiated to an edge, being focused on a non-recording area;

a reflected light of the second beam radiated to the edge and focused on the non-recording area coming from the recording medium is detected; and the address of a location hit by the first radiated beam is calculated from the reflected light of the second radiated beam.

As a result, the laser beam is therefore hardly radiated to an edge having address information of another track, allowing address information to be read out with a reduced amount of crosstalk even in the case of a small track pitch.

BRIEF DESCRIPTION OF THE DRAWINGS

The above and other objects, features as well as many of attendant advantages of the present invention will be more appreciated as the same becomes better understood by reference to the following figures showing the embodiments of the present invention wherein:

FIG. 3 is a cross-sectional diagram showing the configuration of a driving unit 22 employed in the recording/reproducing unit 4 shown in FIG. 2;

FIG. 6 is a block diagram showing a typical configuration of an embodiment implementing an address recording apparatus provided by the present invention;

DETAILED DESCRIPTION OF THE PREFERRED EMBODIMENTS

The present invention will become more apparent from the following detailed description of some preferred embodiments with reference to accompanying diagrams showing the embodiments.

Figure 1:
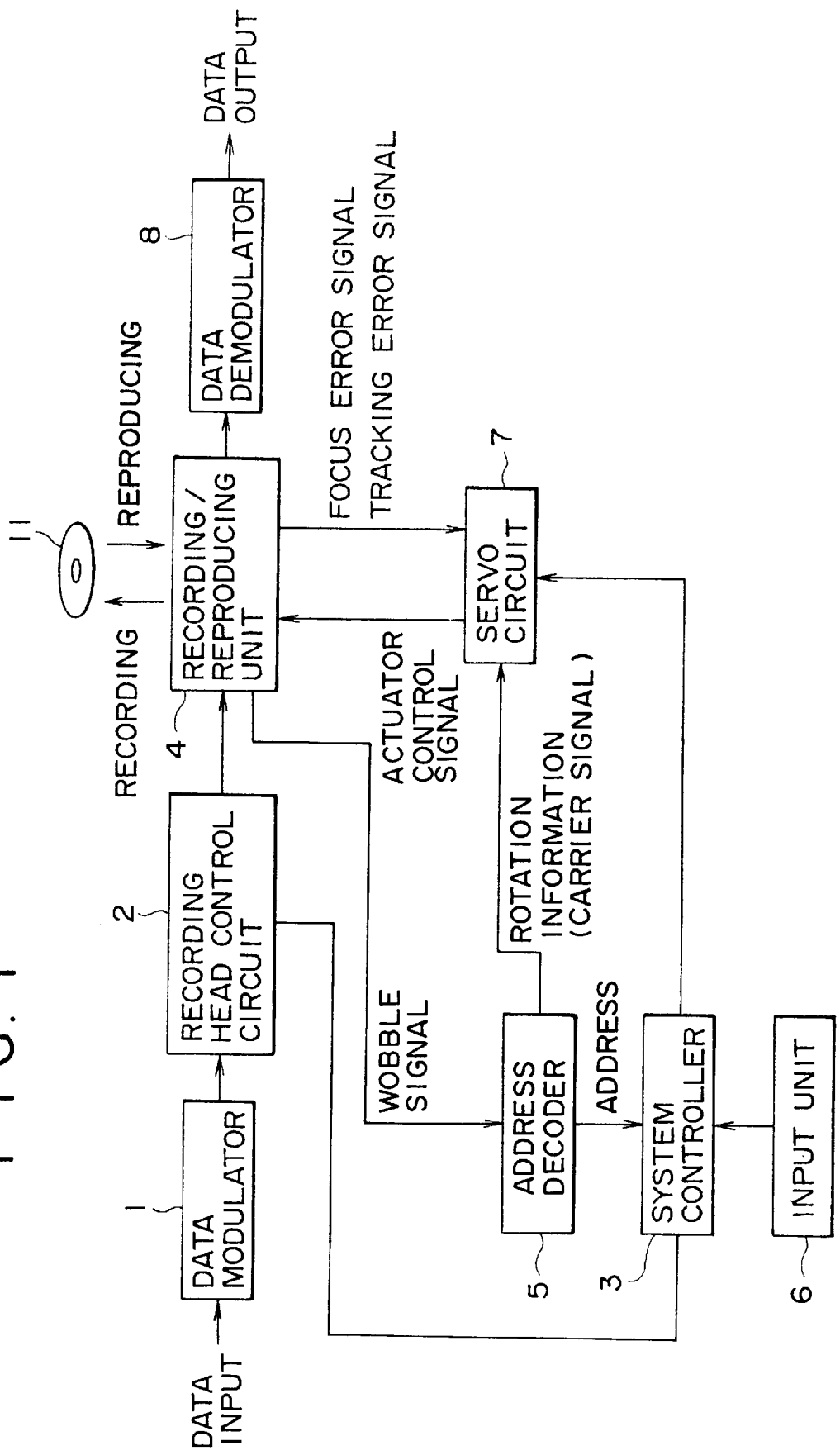
FIG. 1 is a block diagram showing the configuration of an embodiment implementing a recording/reproducing apparatus provided by the present invention.

FIG. 1 is a diagram showing the configuration of a first embodiment implementing a recording/reproducing apparatus provided by the present invention. A data converter 1 employed in the present embodiment converts predetermined input data into code having a predetermined format to be recorded into a disk. The code is supplied by the data converter 1 to a recording-head control circuit 2.

The recording-head control circuit 2 controls a recording/reproducing unit 4 for recording the code supplied by the data converter 1 into a disk 11, a recording medium such as an optical magnetic disk.

The recording/reproducing unit 4 records data (code) into the disk 11 under the control carried out by the recording-head control circuit 2. In addition, the recording/reproducing unit 4 also radiates a laser beam to the disk 11 and receives a light reflected by the disk 11 in order to read out data (code) stored on the disk 11. The data read out from the disk 11 is supplied to a data demodulator 8.

Figure 2:
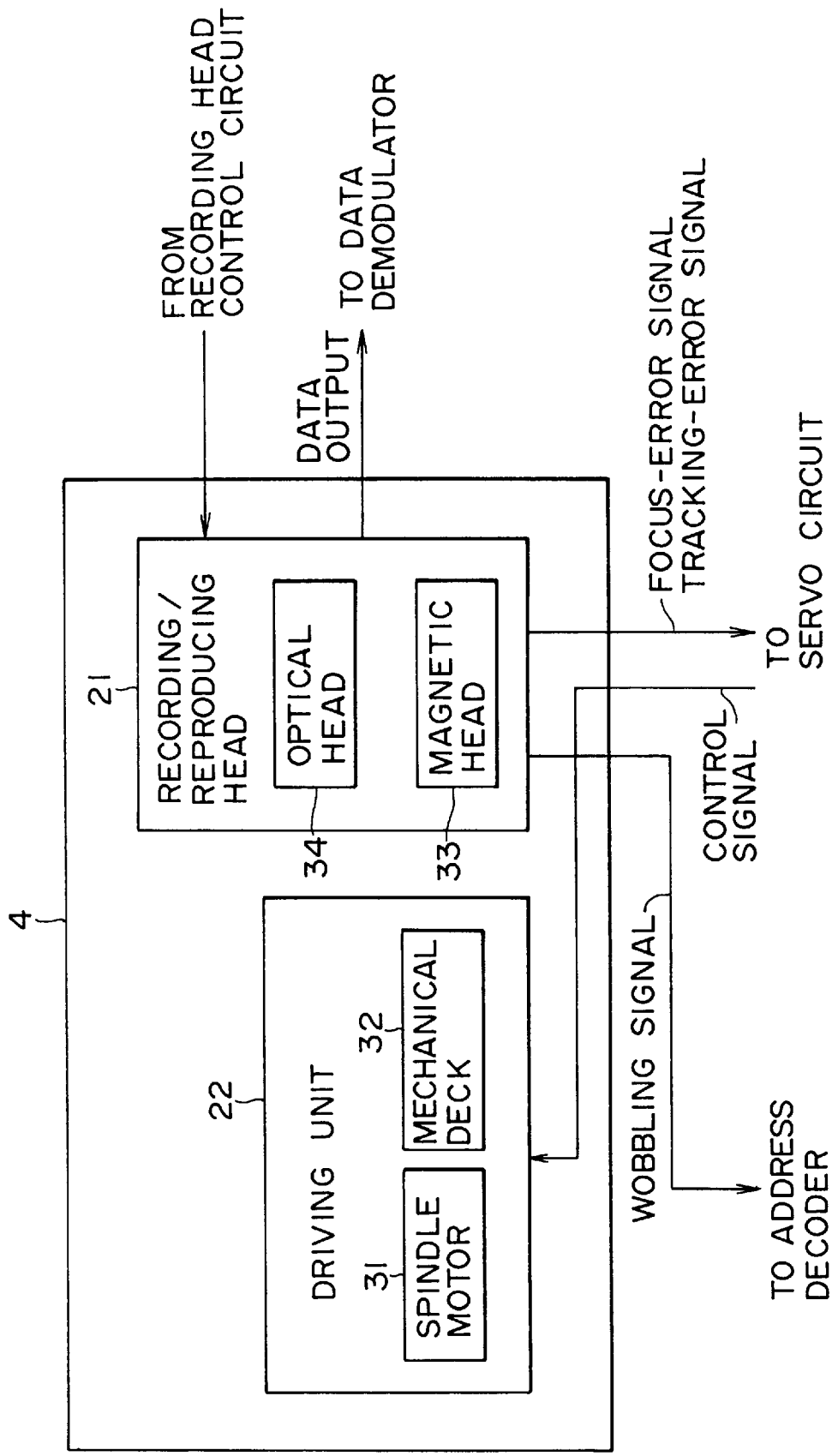
FIG. 2 is a block diagram showing a typical configuration of a recording/reproducing unit 4 employed in the recording/reproducing apparatus shown in FIG. 1.

FIG. 2 is a diagram showing a typical configuration of the recording/reproducing unit 4. A magnetic head 33 and an optical head 34 of a recording/reproducing head 21 operate in accordance with a control signal supplied from the recording-head control circuit 2, generating a magnetic field and a laser beam respectively in an operation to record predetermined data into the disk 11.

Radiating a laser beam to the disk 11, the optical head 34 generates a wobbling signal, a tracking-error signal, a focus-error signal and a detection signal of data from the quantity of a light reflected by the disk 11. The data detection signal is supplied to the data demodulator 8 while the tracking-error signal and the focus-error signal are supplied to a servo circuit 7. On the other hand, the wobbling signal is supplied to an address decoder 5 (a computing means).

A driving unit 22 includes a spindle motor 31 for rotating the disk 11 and a mechanical deck 32 for moving the recording/reproducing head 21. The driving unit 22 operates in accordance with a control signal supplied thereto by the servo circuit 7.

FIG. 3 is a diagram showing a typical configuration of the driving unit 22. The spindle motor 31 rotates the disk 11 along with a turn table 33 on which is the disk 11 is mounted. On the other hand, the mechanical deck 32 moves the recording/reproducing head 21 in the radius direction of the disk 11 in accordance with a control signal supplied thereto by the servo circuit 7.

Figure 4:
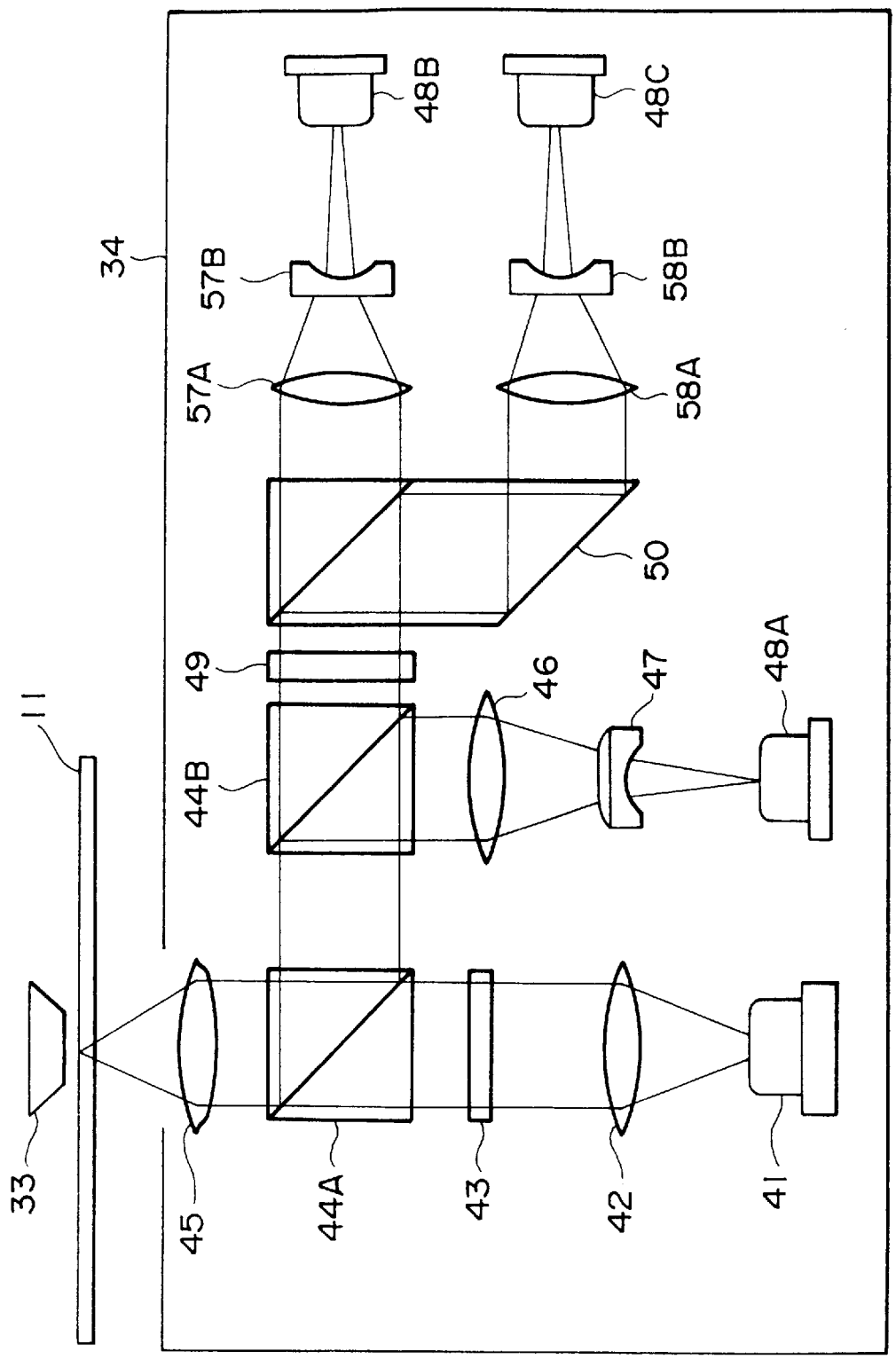
FIG. 4 is a diagram showing a typical configuration of an optical head 34 employed in the recording/reproducing unit 4 shown in FIG. 2.

FIG. 4 is a diagram showing a typical configuration of the recording/reproducing head 21. A laser diode 41 shown in the figures radiates a red laser beam with a wavelength of 680 nm. The red laser beam reaches the disk 11 by way of a collimator lens 42, a grating 43, a beam splitter 44A and an object lens 45 (a radiation means), creating an image on a predetermined area on a recording layer of the disk 11. A light reflected by the disk 11 again enters the beam splitter 44A by way of the object lens 45. In the beam splitter 44A, part of a p-polarization light component (typically, 30% of the p-polarization light component) and all of an s-polarization light component are extracted before the reflected light hits a beam splitter 44B. Part of the laser beam arriving at the beam splitter 44B enters a lens 46 while most of the remaining part hits a polarization beam splitter 50 by way of a half-wavelength plate 49. The polarization beam splitter 50 splits the incident laser beam into an s polarization component and a p polarization component which enter lenses 56 and 58 respectively.

The laser beam hitting the lens 46 from the beam splitter 44A enters a photo diode 48A by way of a lens 47 which gives astigmatism to the beam. In the photo diode 48A, the laser beam is converted into an electrical signal representing the intensity of the laser beam. The electrical signal is supplied to the servo circuit 7 as a servo signal comprising a focus-error signal and a tracking-error signal. One of the split laser beams radiated by the polarization beam splitter 50 enters a photo diode 48B by way of the lens 56 and a lens 57. The other split laser beam enters a photo diode 48C by way of the lens 58 and a lens 59. Much like the photo diode 48A, the photo diodes 48B and 48C each convert the split laser beam arriving therein into an electrical signal representing the intensity of the beam. The electrical signals output by the photo diodes 48B and 48C are amplified by a differential amplifier and supplied to the data demodulator 8 as a data detection signal.

The magnetic head 33 is provided at a counterpart location of the object lens 45 with respect to the disk 11, sandwiching the disk 11 in conjunction with the object lens 45. The magnetic head 33 generates a magnetic field at a recording location, applying the magnetic field to the disk 11.

Figure 5:
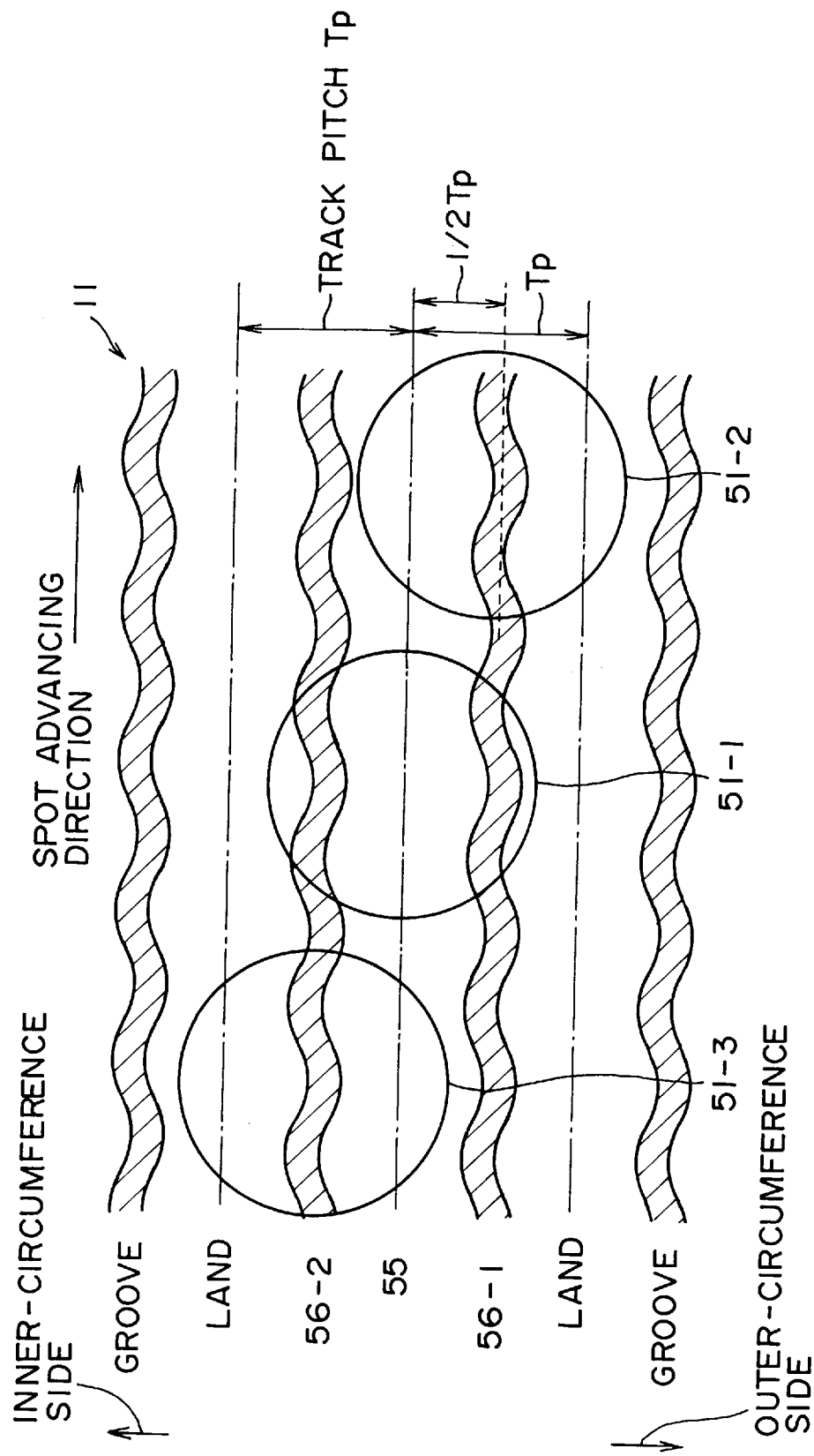
FIG. 5 is a diagram showing a typical configuration seen from the flat surface of a recording medium provided by the present invention.

FIG. 5 is a diagram showing a typical configuration seen from the flat surface of a recording medium employed in the present embodiment which data is recorded into or played back from. The surface of the disk 11 has unevenness known as grooves and lands along the circumferential direction of the disk 11. In the disk 11, a land is used as a track which data is recorded into or played back from. A groove is wobbled in accordance with address information. It should be noted that, on the other hand, a groove is used as a non-recording area. Therefore, data is not recorded into a groove and no data is played back from it either. For example, the address information of a land 55 for recording data is held as the shape of the right and left edges (both the edges) of a groove 56-1 on the outer-circumference side (or the right side of the figure).

It should be noted, however, that a groove of b the disk 11 can be reversely used as a track while a land thereof as a non-recording area. In this case, typically, the edge on the right side of a predetermined groove and the edge on the left side of the right adjacent groove are used for storing address information of the predetermined groove.

FIG. 6 is a diagram showing the configuration of an embodiment implementing an address recording apparatus provided by the present embodiment. An address-signal generating circuit 85 generates an address signal for the disk 11 (or a disk 88), supplying the address signal to a modulation circuit 86.

The modulation circuit 86 uses the address signal supplied thereto for carrying out frequency modulation on a carrier having a predetermined frequency. A signal (strictly speaking, an FM signal) resulting from the frequency modulation is supplied to an optical head 87 which serves as a recording means.

The optical head 87 radiates a laser beam to the disk 88 (a raw disk) having the surface thereof coated with photoresist while wobbling the laser beam in accordance with the modulated signal, that is, the FM signal.

While the disk 88, which has the surface thereof coated with photoresist, is being rotated by a motor 89 at a constant speed, the laser beam is applied to the surface of the disk 88. In this way, the surface of the disk 88 reacts to the laser beam radiated by the optical head 87, forming a wobbled shape representing address information prior to a development process for creating wobbled grooves and a land between any two adjacent grooves.

Then, a stamper is created from the unevenness of the surface of the disk 88. A number of disks 11 are further created from the stamper as replica disks. It should be noted that, in this specification, a portion created as a result of exposure is called a groove and a portion created with no exposure is called a land. In other words, lands are created as a result of creating grooves.

As described above, when a stamper of the disk 11 is created, a laser beam is radiated to the disk 88 and the laser beam is wobbled in accordance with address information in order to record address information on edges of a track. Then, information is further transferred to a disk 11 from the stamper to which information was transferred from the disk 88 in order to manufacture the disk 11 with the edges of the tracks thereof wobbled in accordance with the address information.

In this way, on the right and left edges of a groove, address information of a land on the inner-circumference side adjacent to the groove are recorded as shown in FIG. 5.

As shown in FIG. 5, on the disk 11, a land is used as a track, an area which data is recorded into and played back from. Thus, a spot 51-1 of a laser beam for recording and playing back data is radiated to a land 55 in such a way that the center of the spot 51-1 coincides with the center of land 55 (that is, the center of the track). Spots 51-2 and 51-3 of laser beams on both sides (that is, laser beams for detection of a tracking error) are used for carrying out a tracking servo by using the so-called DPP (Differential Push-Pull) technique. Thus, the spots 51-2 and 51-3 are radiated to the centers of grooves 56-1 and 56-2 respectively at locations on the outer-circumference and inner-circumference sides of the disk 11 which are separated away from the center line of the land 55 by a distance equal to one half of the track pitch. At that time, since the spots 51-2 and 51-3 do not overlap other grooves, generation of crosstalk can be suppressed.

As described above, by radiating the two laser beams (known as side beams) for detection of a tracking errors only to the grooves 56-1 and 56-2 respectively which are adjacent to the land 55 for recording and playing back data, address information can be read out with a high degree of accuracy even if the width of a groove with no data recorded thereon and the track pitch are small as shown in FIG. 5.

Figure 7:
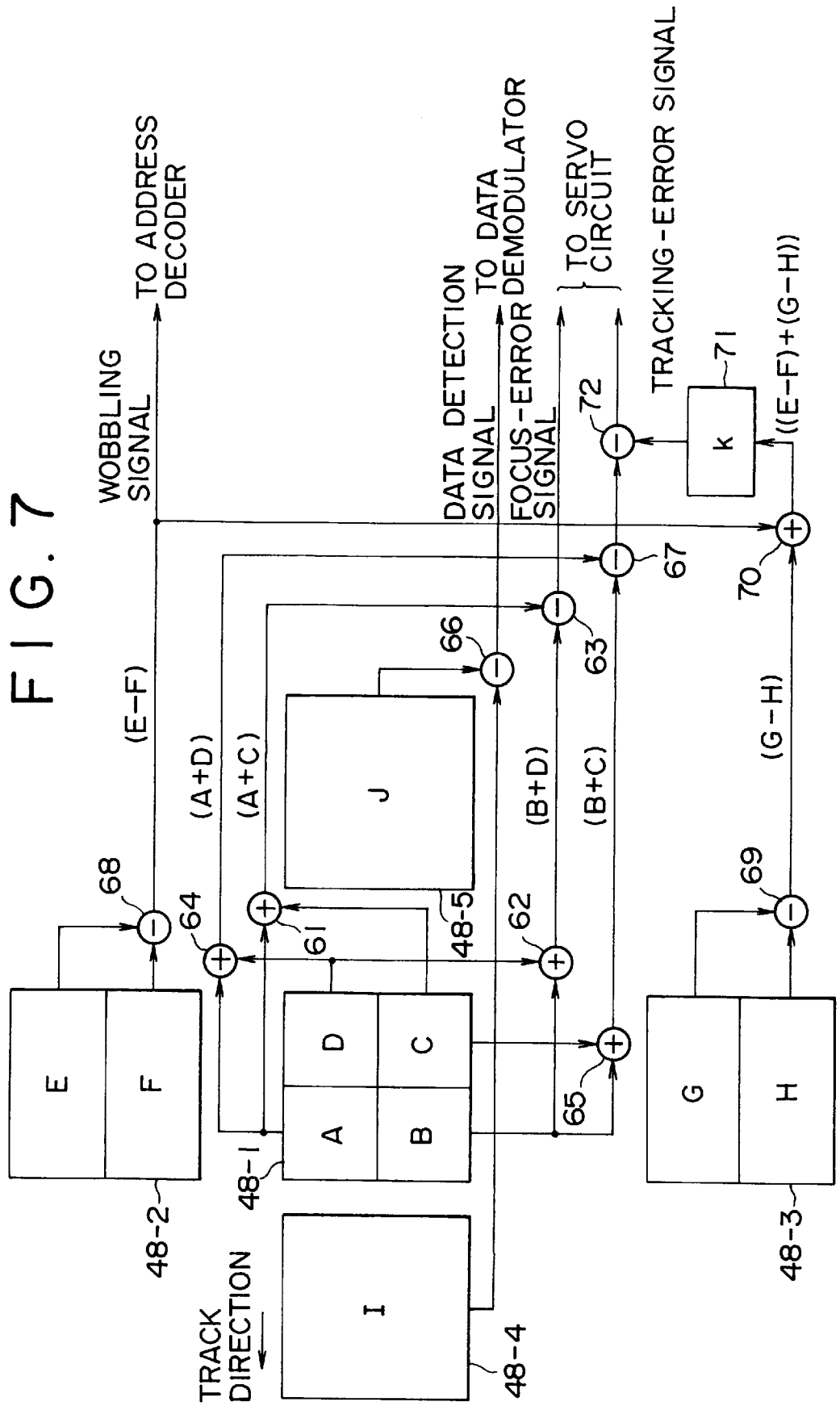
FIG. 7 is a block diagram showing a typical internal electrical configuration of an optical head 34 employed in the recording/reproducing unit 4 shown in FIG. 2.

FIG. 7 is a diagram showing a typical electrical internal configuration of the optical head 34. In this embodiment, the focus servo is carried out in accordance with an astigmatism technique. A light receiving unit 48-1 of a photo diode 48A for receiving a returned light for detection of a focus error from the spot 51-1 are divided into four light receiving regions A to D. The tracking servo is carried out by using three laser beams in accordance with the DPP technique. A light receiving unit (light detecting means) 48-2 of the photo diode 48A for receiving the remaining returned light from the spot 51-2 is divided into two light receiving regions E and F. By the same token, another light receiving unit 48-3 of the photo diode 48A for receiving the other remaining returned light from the spot 51-3 is divided into two light receiving regions G and H. The photo diodes 48B and 48C for receiving a returned light for detection of data from the spot 51-1 have light receiving regions I and J respectively.

When each of the light receiving regions A to J receives a light, the light is converted into an output electrical signal representing the quantity of the light.

Figure 8:
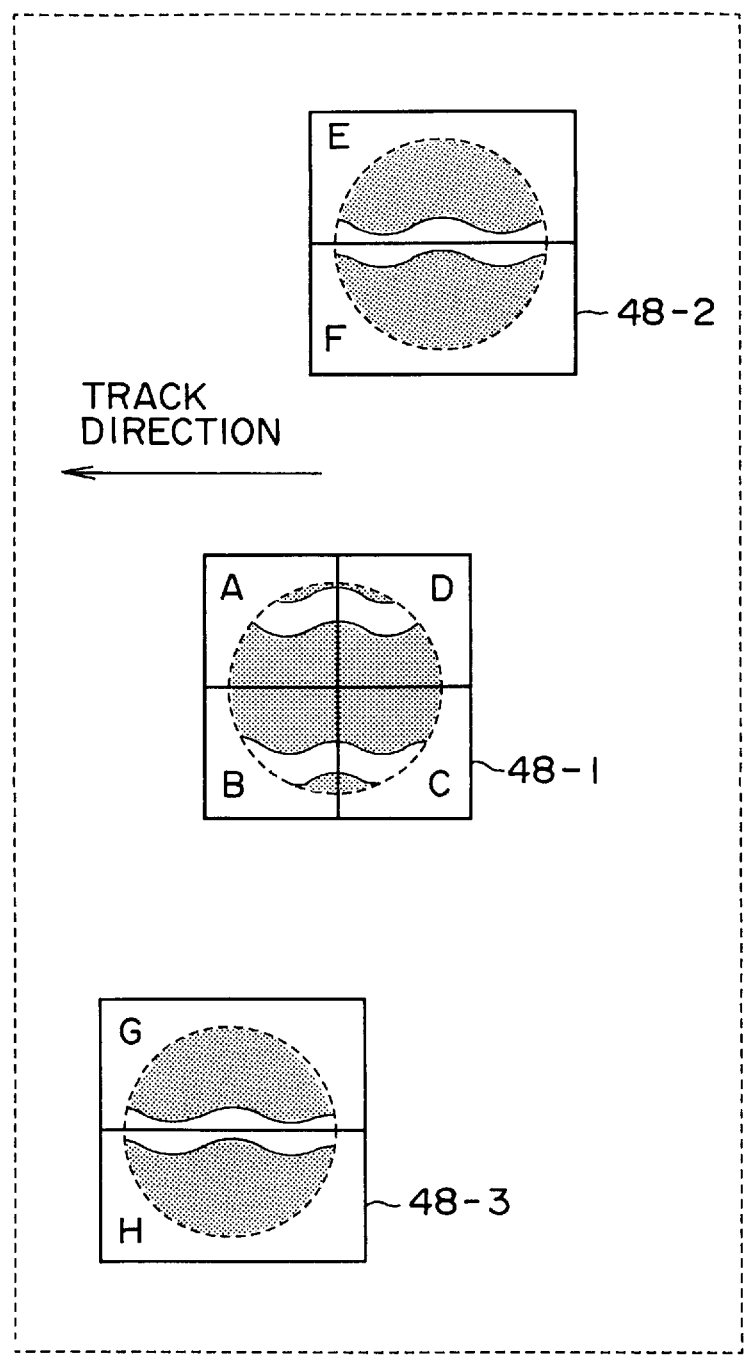
FIG. 8 is a diagram showing an example of spots reflecting returned lights to light receiving units 48-1 to 48-3 employed in the optical head 34 shown in FIG. 7.

It should be noted that, in the present embodiment, since all the three returned lights entering the photo diode 48A pass through the lens 47, the spot patterns at the light receiving units 48-1 to 48-3 are rotated by 90 degrees. Thus, as shown in FIG. 8, the returned light from the outer-circumference half of the spot 51-1 on the disk 11 enters the light receiving regions A and D and the returned light from the outer-circumference half of the spot 51-2 on the disk 11 enters the light receiving region E. On the other hand, the returned light from the outer-circumference half of the spot 51-3 on the disk 11 enters the light receiving region G. By the same token, the returned light from the inner-circumference half of the spot 51-1 on the disk 11 enters the light receiving regions B and C and the returned light from the inner-circumference half of the spot 51-2 on the disk 11 enters the light receiving region F. On the other hand, the returned light from the inner-circumference half of the spot 51-3 on the disk 11 enters the light receiving region H.

An adder 61 calculates the sum of the electrical signals output by the light receiving regions A and C of the light receiving unit 48-1 and outputs the sum (A+C) resulting from the addition to a subtractor 63.

An adder 62 calculates the sum of the electrical signals output by the light receiving regions B and D of the light receiving unit 48-1 and outputs the sum (B+D) resulting from the addition also to the subtractor 63.

The subtractor 63 calculates a difference between the sum (A+C) output by the adder 61 and the sum (B+D) output by the adder 62, supplying the difference ((A+C)−(B+D)) resulting from the subtraction to the servo circuit 7.

Since the returned light entering the photo diode 48A experiences astigmatism by the lens 47, in the case of an in-focus state, the spot of the returned light on the light receiving unit 48-1 of the photo diode 48A forms a circle, resulting in a zero focus-error signal. In the case of an out-off-focus state, on the other hand, the spot of the returned light forms an ellipse. In this case, the short and long axes of the ellipse are swapped with each other as the position in question moves from one side of the focus position to another side of thereof along the optical axis.

In the present embodiment, if the long axis of the elliptical spot is oriented in a direction from the light receiving region A to the light receiving region C, the focus-error signal has a predetermined positive value. If the long axis of the elliptical spot is oriented in a direction from the light receiving region B to the light receiving region D, on the other hand, the focus-error signal has a predetermined negative value. Thus, focus adjustment is carried out by moving the object lens 45 in accordance with the sign (that is, whether the sign is positive or negative) and the magnitude of the focus-error signal.

An adder 64 calculates the sum of the electrical signals output by the light receiving regions A and D of the light receiving unit 48-1 and outputs the sum (A+D) resulting from the addition to a subtractor 67.

An adder 65 calculates the sum of the electrical signals output by the light receiving regions B and C of the light receiving unit 48-1 and outputs the sum (B+C) resulting from the addition also to the subtractor 67.

The subtractor 66 calculates a difference between an electrical signal output by the light receiving region I of the photo diode 48B and an electrical signal output by the light receiving region J of the photo diode 48C, supplying the difference (I−J) resulting from the subtraction to the data demodulator 8 as a data detection signal (an RF signal).

In this way, the optical head 34 outputs the difference between the electrical signal output by the light receiving region I of the light receiving unit 48-4 of the photo diode 48B and the electrical signal output by the light receiving region J of the light receiving unit 48-5 of the photo diode 48C as a data detection signal.

The subtractor 67 calculates a difference between the sum (A+D) output by the adder 64 and the sum (B+C) output by the adder 65, supplying the difference ((A+D)−(B+C)) resulting from the subtraction to a subtractor 72.

A subtractor 68 calculates a difference between an electrical signal output by the light receiving region E of the light receiving unit 48-2 of the photo diode 48A and an electrical signal output by the light receiving region F of the light receiving unit 48-2 of the photo diode 48A, supplying the difference (E−F) resulting from the subtraction to an adder 70 as well as to an address decoder 5 as a wobbling signal.

In this way, a laser beam for detection of a tracking error (instead of a laser beam for detection of data) is used for calculating a wobbling signal. As described above, the difference (E−F) between an electrical signal output by the light receiving region E of the light receiving unit 48-2 of the photo diode 48A and an electrical signal output by the light receiving region F of the light receiving unit 48-2 of the photo diode 48A is used a wobbling signal. It should be noted, however, that the difference (G−H) between an electrical signal output by the light receiving region G of the light receiving unit 48-3 and an electrical signal output by the light receiving region H of the light receiving unit 48-3 can also be used as a wobbling signal.

A subtractor 69 calculates a difference between an electrical signal output by the light receiving region G of the light receiving unit 48-3 of the photo diode 48A and an electrical signal output by the light receiving region H of the light receiving unit 48-3 of the photo diode 48A, supplying the difference (G−H) resulting from the subtraction to the adder 70.

The adder 70 calculates the sum of the difference (E−F) output by the subtractor 68 and the difference (G−H) output by the subtractor 69, supplying the sum ((E−F)+(G−H)) resulting from the addition to a coefficient multiplier 71.

The coefficient multiplier 71 multiplies the output of the adder 70 by a coefficient k, outputting the product (k×((E−F)+(G−H))) resulting from the multiplication to a subtractor 72.

The subtractor 72 calculates the difference between the output of the subtractor 67 and the output of the coefficient multiplier 71, supplying the difference (((A+D)−(B+C))−k×((E−F)+(G−H))) resulting from the subtraction to the servo circuit 7 as a tracking-error signal.

As described above, the electrical signals output by the light receiving regions A and D of the light receiving unit 48-1 receiving a returned light from the outer-circumference half of the spot 51-1, the electrical signal output by the light receiving region E of the light receiving unit 48-2 receiving a returned light from the outer-circumference half of the spot 51-2, the electrical signal output by the light receiving region G of the light receiving unit 48-3 receiving a returned light from the outer-circumference half of the spot 51-3, the electrical signals output by the light receiving regions B and C of the light receiving unit 48-1 receiving a returned light from the inner-circumference half of the spot 51-1, the electrical signal output by the light receiving region F of the light receiving unit 48-2 receiving a returned light from the inner-circumference half of the spot 51-2 and the electrical signal output by the light receiving region H of the light receiving unit 48-3 receiving a returned light from the inner-circumference half of the spot 51-3 are manipulated for comparison in order to detect shifts of the spots 51-1 to 51-3 in the radius direction of the disk as a tracking-error signal. The tracking servo is then carried out in accordance with the sign (that is, whether the sign is positive or negative) and the magnitude of the tracking-error signal.

The discussion returns to FIG. 1. The address decoder 5 computes address information and information on the rotation of the disk 11 from a signal (the wobbling signal) supplied by the recording/reproducing unit 4. The address information and the information on the rotation of the disk 11 are supplied to a system controller 3 and the servo circuit 7 respectively.

The system controller 3 outputs, among other data, the address information to the recording-head control circuit 2. When a signal representing a predetermined operation is received by the system controller 3 from an input unit 6, a control signal representing the operation is output to the servo circuit 7 to request the servo circuit 7 to control the recording/reproducing unit 4.

The servo unit 7 controls the driving unit 22 of the recording/reproducing unit 4 in accordance with the focus-error signal and the tracking-error signal received from the recording/reproducing unit 4 and, by moving the entire optical head 34 and the object lens 45 of the optical head 34, the servo unit 7 adjusts the focus and tracking of a laser beam used for detection of data.

In addition, the servo unit 7 also controls the recording/reproducing unit 4 in accordance with a control signal received from the system controller 3.

The data demodulator 8 demodulates data read out by the recording/reproducing unit 4 from the disk 11, restoring the data into the original data thereof.

Next, the operation of the present embodiment is explained.

First of all, when data is to be recorded into the disk 11, a predetermined operation is carried out at the input unit 6. In response to the operation, the system controller 3 supplies a predetermined signal representing the operation to the servo circuit 7. Receiving the signal, the servo circuit 7 controls the recording/reproducing unit 4 in accordance with the signal. After the rotation of the disk 11 and the radiation of a laser beam have started, a tracking-error signal, a focus-error signal and a wobbling signal are monitored by the recording/reproducing unit 4.

The tracking-error signal and the focus-error signal detected by the recording/reproducing unit 4 are supplied to the servo circuit 7. In turn, the servo circuit 7 supplies a predetermined control signal to the driving unit 22 in accordance with the tracking-error signal and the focus-error signal, carrying out focus and tracking servos.

On the other hand, the wobbling signal detected by the recording/reproducing unit 4 is supplied to the address decoder 5 for converting the wobbling signal into address information which is then supplied to the system controller 3.

The system controller 3 drives the driving unit 22 of the recording/reproducing unit 4 into operation while referencing the address information supplied thereto, requesting the servo circuit 7 to move the magnetic head 33 and the optical head 34 to a position for recording data.

As the magnetic head 33 and the optical head 34 arrive at the position for recording data, the system controller 3 requests the recording-head control circuit 2 to record data (code).

In response to the request made by the system controller 3, the recording-head control circuit 2 controls the magnetic head 33 to record data (code) into a track (that is, a land in this case) of the disk 11.

In this way, data is recorded into the disk 11.

Next, when data is to be played back from the disk 11, a predetermined operation is carried out at the input unit 6. In response to the operation, the system controller 3 supplies a predetermined signal representing the operation to the servo circuit 7. Receiving the signal, the servo circuit 7 controls the recording/reproducing unit 4 in accordance with the signal. After the rotation of the disk 11 and the radiation of a laser beam have started, a tracking-error signal, a focus-error signal and a wobbling signal are monitored by the recording/reproducing unit 4.

The tracking-error signal and the focus-error signal detected by the recording/reproducing unit 4 are supplied to the servo circuit 7. In turn, the servo circuit 7 supplies a predetermined control signal to the driving unit 22 in accordance with the tracking-error signal and the focus-error signal, carrying out focus and tracking servos.

On the other hand, the wobbling signal detected by the recording/reproducing unit 4 is supplied to the address decoder 5 for converting the wobbling signal into address information which is then supplied to the system controller 3.

The system controller 3 drives the driving unit 22 of the recording/reproducing unit 4 into operation while referencing the address information supplied thereto, requesting the servo circuit 7 to move the optical head 34 to a position for playing back data.

While the focus and tracking servos are being carried out in this way, the data detection signal detected by the recording/reproducing unit 4 is supplied to the data modulator 8. The data demodulator 8 demodulates the data detection signal read out by the recording/reproducing unit 4 from the disk 11, restoring the signal into the original data thereof.

In this way, data is played back from the disk 11.

As described above, in the first embodiment, a laser beam for detection of a tracking error radiated to a groove is utilized for detecting a wobbling signal, from which an address is computed. It should be noted that, in the first embodiment, a laser beam radiated for detection of a tracking error is focused on a groove with no data recorded therein, and the laser beam is used for reading out address information. As a result, the amount of crosstalk generated by other tracks can be reduced, allowing the track pitch to be decreased to a value in the range 0.85 to 0.90 microns.

The following description explains a second embodiment implementing a recording/reproducing apparatus for recording and playing back data into and from a disk with grooves thereof each having a wobbled edge on one side only.

Figure 9:
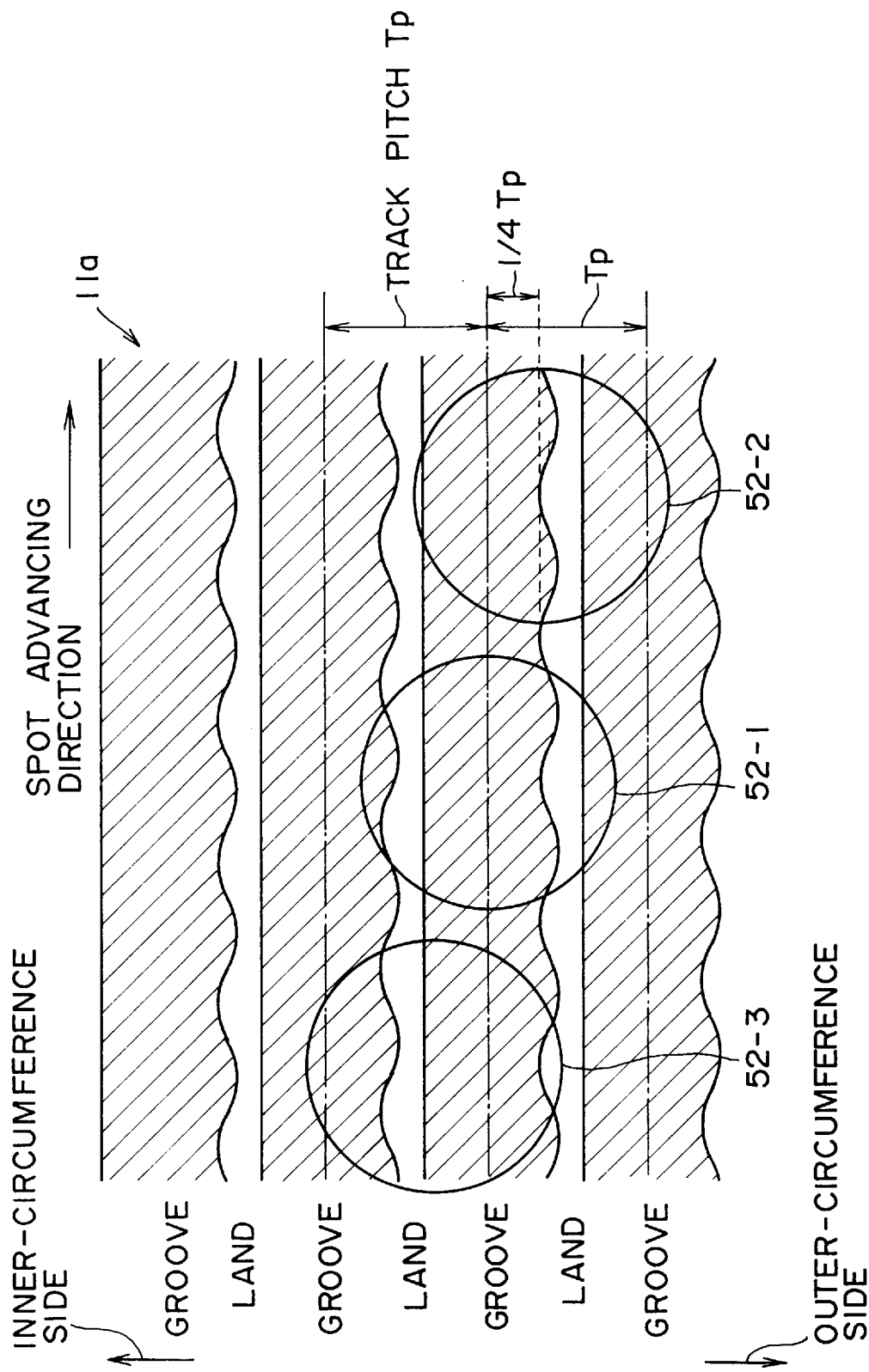
FIG. 9 is a diagram showing another typical configuration of a recording medium provided by the present invention.

FIG. 9 is a diagram showing a typical configuration seen from the flat surface of a recording medium with grooves thereof each having a wobbled edge on one side only. On a disk 11a shown in the figure, each groove is used as a track and only the edge of the groove on one side is wobbled. It should be noted that each land is used as a non-recording area which data is not recorded into and played back from.

It should be noted, however, that it is also possible to reversely use each land and each groove of the disk 11a as a track and a non-recording area respectively and record address information of the track (or the land) on the edge on one side (the land side) of the groove.

Much like the disk 11 shown in FIG. 5, such a disk 11a is created by using the address recording apparatus shown in FIG. 6. When carrying out an exposure process on a disk 88, however, the optical head 87 uses two beams (strictly speaking, laser beams). One of the beams is wobbled in accordance with address information to be recorded while the other beam is not, that is, the other beam is fixed. In this way, only the edge on one side of a groove is wobbled and the edge on the other side forms a straight line, strictly speaking, an arc of a circle. By doing this, it is possible to create a disk in which address information is recorded on the edge of the outer-circumference side and no address information is recorded on the edge of the inner-circumference side of each track (each groove) as shown in FIG. 9.

In the second embodiment, a tracking servo adopting the three-spot technique and a focus servo using the astigmatism method are carried out. The optical head 34 radiates one of the three laser beams for detection of data (as well as for detection of a focus error) to a groove (used as a track) in such a way that the center of the spot 52-1 thereof coincides with the center of the groove (track) as shown in FIG. 9. The two remaining laser beams (known as side beams) are radiated to locations on the outer-circumference and inner-circumference sides of the disk 11a each separated away from the center of the laser beam for detection of data by a quarter of the track pitch. In addition, the two remaining laser beams respectively precede and succeed the laser beam for detection of data, sandwiching the laser beam for detection of data in the tangential direction of the track.

By doing this, the spot 52-2 of one of the two laser beams includes the wobbled edge of the track currently undergoing data recording or data reproduction but never includes the wobbled edge of a track adjacent to the track in question. By detecting a returned light from this spot 52-2, it is possible to obtain a wobbling signal with a reduced amount of crosstalk. It should be noted that the spot 52-2 shown in FIG. 9 includes an unwobbled edge. Since the edge has a fixed shape, however, the crosstalk thereof can be separated away with ease.

It is worth noting that, as described above, since only the edge on one side is wobbled and a laser beam for reading out address information is radiated by focusing the laser beam on the wobbled edge, the amount of crosstalk can be reduced, allowing the address information to be read out with a high degree of accuracy even in the case of a small land width and a small track pitch shown in FIG. 9.

Figure 10:
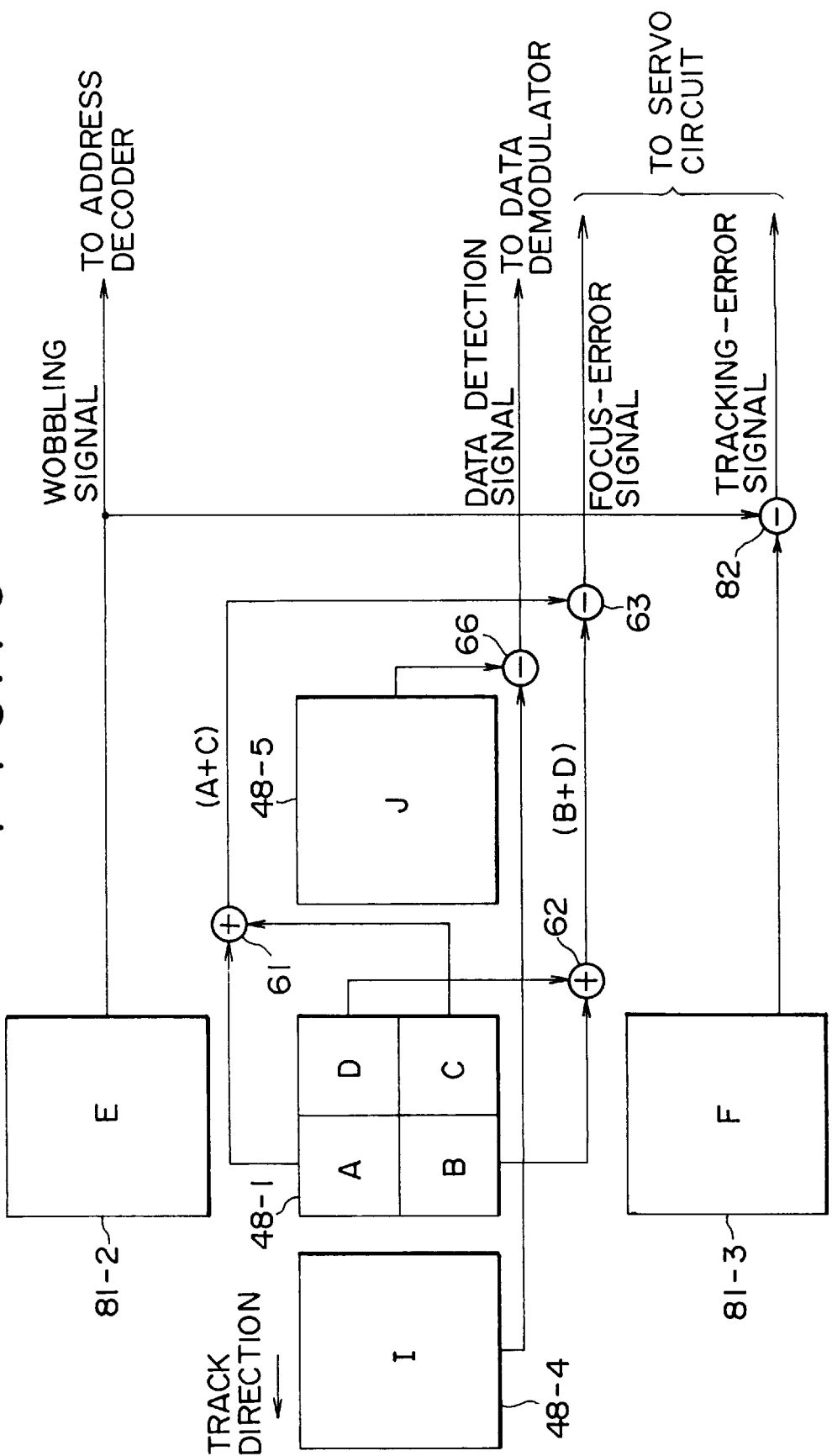
FIG. 10 is a block diagram showing another typical internal electrical configuration of the optical head 34 employed in the recording/reproducing unit 4 shown in FIG. 2.

FIG. 10 is a diagram showing a typical electrical configuration of the optical head 34 for processing a returned light coming from such a disk.

Light receiving units (or light detecting means) 81-2 and 81-3 for detecting laser beams for detection of a tracking error from the spots 52-2 and 52-3 have light-receiving regions E and F respectively. Much like the configuration of the optical head 34 shown in FIG. 7, the light receiving unit 48-1 for detecting a returned light for detection of a focus error is divided into four light receiving regions A to D each for converting an incident light received thereby into an electrical signal representing the quantity of the incident light.

Light receiving units 48-4 and 48-5 for detecting returned lights for detection of data, adders 61, 62, 64 and 65 as well as subtractors 63 and 66 operate in the same way as those shown in FIG. 7 and, therefore, the explanation of their operations is omitted. The subtractor 66 computes the difference (I–J) between electrical signals output by the light receiving units 48-4 and 48-5, outputting the difference (I–J) resulting from the subtraction to the data demodulator 8 as a data detection signal. The subtractor 63 computes the difference ((A+C)–(B+D)) between signals output by the adders 61 and 62, outputting the difference ((A+C)–(B+D)) resulting from the subtraction to the servo circuit 7 as a focus-error signal.

The light receiving unit 81-2 outputs an electrical signal representing the quantity of a light received by the light receiving region E to a subtractor 82 as well as to an address decoder 5 as a wobbling signal.

The light receiving unit 81-3 outputs an electrical signal representing the quantity of a light received by the light receiving region F to the subtractor 82.

The subtractor 82 calculates the difference between the electrical signal output by the light receiving unit 81-2 and the electrical signal output by the light receiving unit 81-3, supplying the difference (E–F) resulting from the subtraction to the servo circuit 7 as a tracking-error signal.

The address decoder 5 computes an address from the electrical signal E output by the light receiving unit 81-2 supplied thereto.

Since the remaining part of the configuration is the same as the first embodiment, its explanation is omitted.

Figure 16:
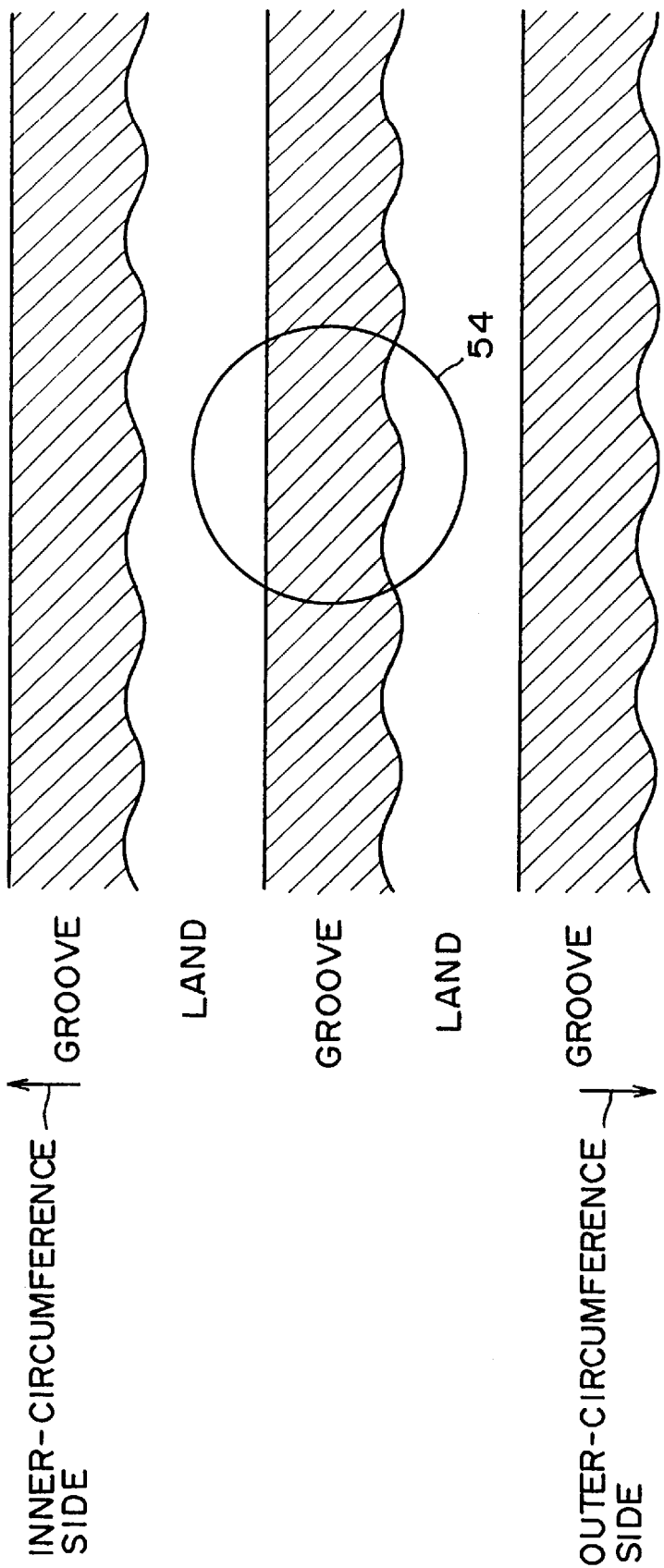
FIG. 16 is a diagram showing another typical configuration seen from the flat surface of a conventional recording medium.

As described above, in the second embodiment, a laser beam for tracking-servo use is radiated to a disk with each groove thereon having a wobbled edge only on one side thereof by focusing the laser beam on the wobbled edge of a groove currently undergoing a data recording or reproducing operation and a wobbling signal representing the wobbling shape is detected out off a returned signal from the wobbled edge. The address of a recording or reproducing location is further calculated from the wobbling signal. It should be noted that the second embodiment also allows recording and reproducing operations to be carried out on a disk like the one shown in FIG. 16.

Figure 11:
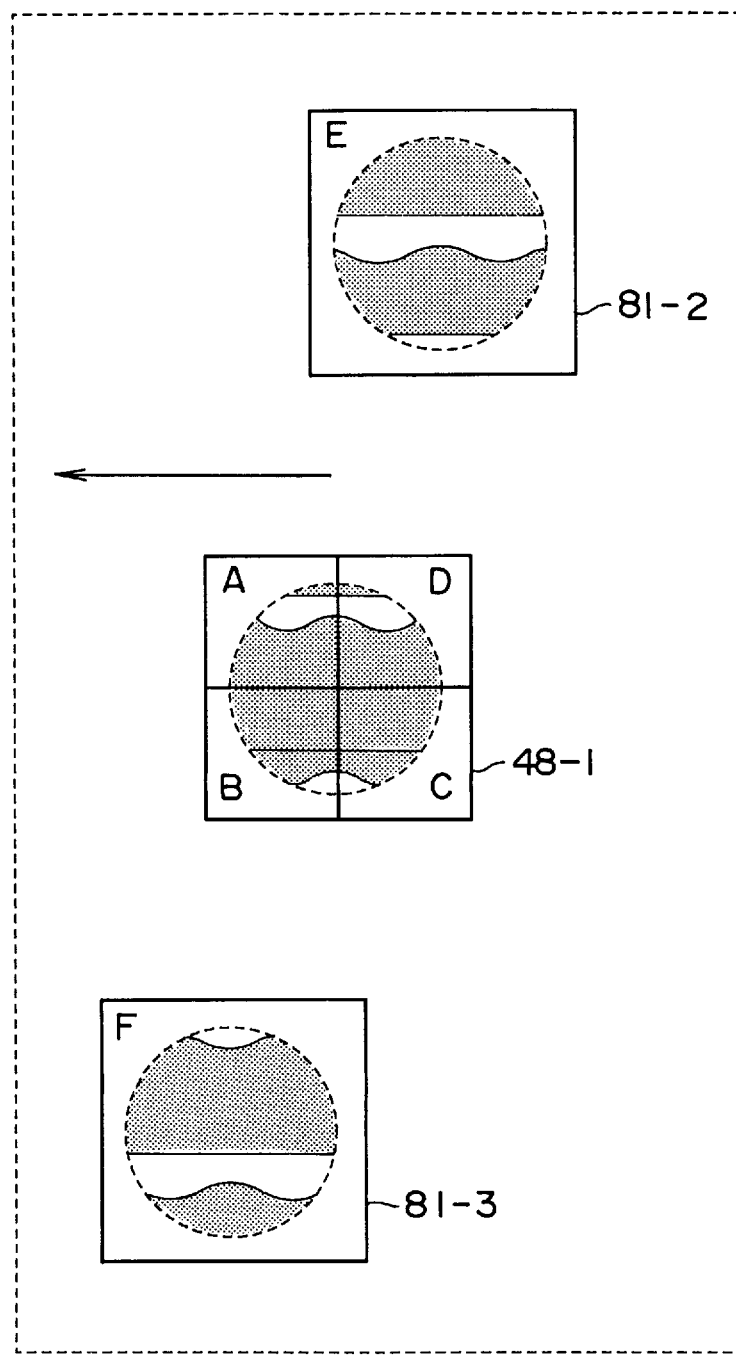
FIG. 11 is a diagram showing an example of spots reflecting returned lights to light receiving units 48-1, 81-2 and 81-3 employed in the optical head 34 shown in FIG. 10.

It is worth noting that, much like the first embodiment, also in the case of the second embodiment, since all the three returned lights entering the photo diode 48A pass through the lens 47, the spot patterns at the light receiving unit 48-1 and the light receiving units 81-2 and 81-3 are rotated by 90 degrees. Thus, as shown in FIG. 11, the returned light from the outer-circumference half of the spot 52-1 on the disk 11a enters the light receiving regions A and D and the returned light from the outer-circumference half of the spot 52-2 on the disk 11a enters the upper half of the light receiving region E. On the other hand, the returned light from the outer-circumference half of the spot 52-3 on the disk 11a enters the upper half of the light receiving region F. By the same token, the returned light from the inner-circumference half of the spot 52-1 on the disk 11a enters the light receiving regions B and C and the returned light from the inner-circumference half of the spot 52-2 on the disk 11a enters the lower half of the light receiving region E. On the other hand, the returned light from the inner-circumference half of the spot 52-3 on the disk 11a enters the lower half of the light receiving region F.

As described above, in the case of the second embodiment, the electrical signal output by the light receiving region E of the light receiving unit 81-2 is used as a wobbling signal. It should be noted, however, that much like the light receiving unit 48-2, the light receiving unit 81-2 can be divided into two light receiving regions E1 and E2 and the difference (E1−E2) between electrical signals output by the light receiving regions E1 and E2 can be used as a wobbling signal.

The following description explains a third embodiment, another embodiment implementing a recording/reproducing apparatus for recording and playing back data into and from a disk 11a with grooves thereon each having a wobbled edge on one side only as shown in FIG. 9.

Figure 12:
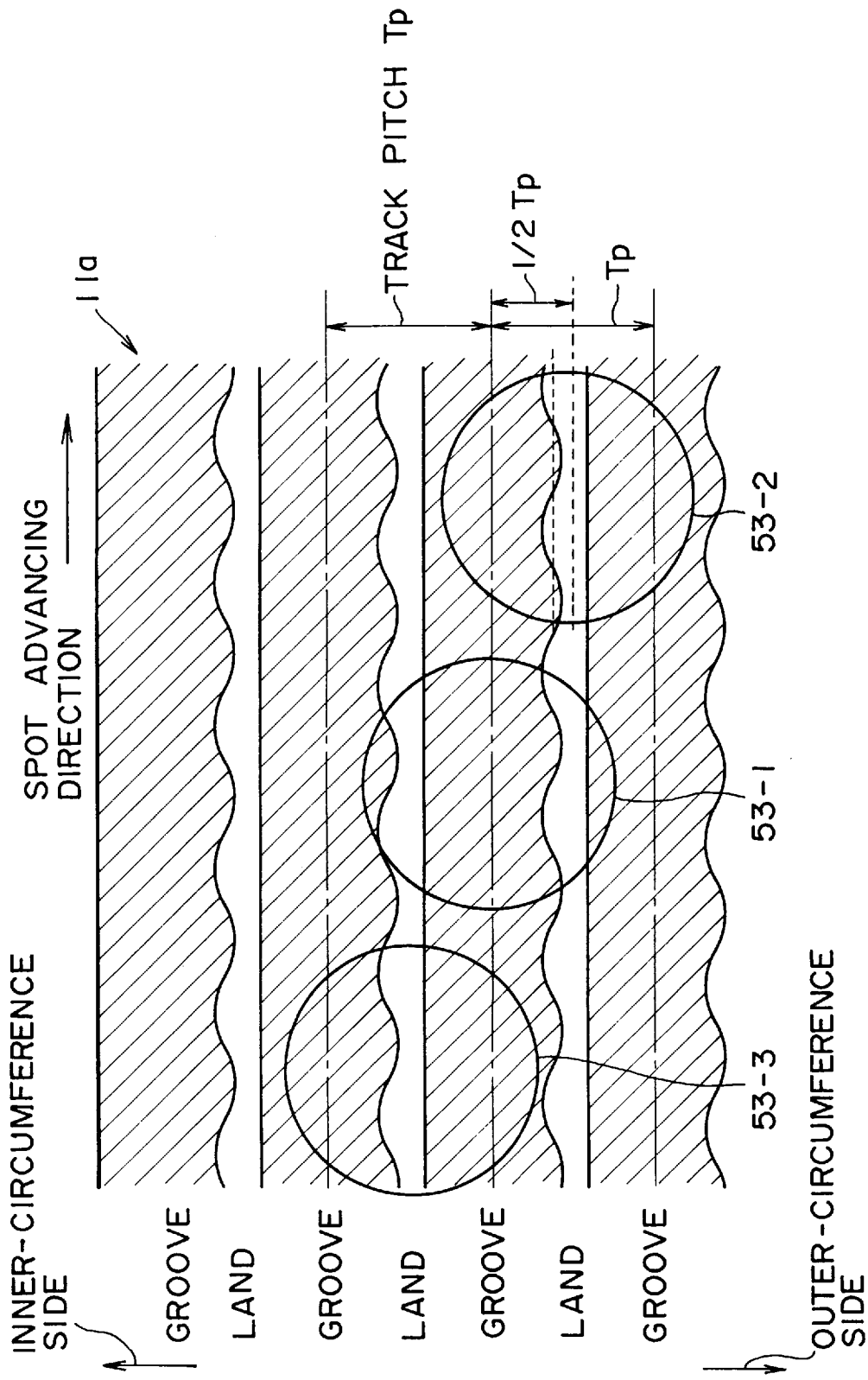
FIG. 12 is a diagram showing a state in which laser beams are radiated to the recording medium shown in FIG. 9.

Much like the first embodiment, in the third embodiment, a tracking servo adopting the DPP technique and a focus servo using the astigmatism method are carried out. As shown in FIG. 12, the laser beam for detection of data is radiated to a groove (used as a track) for recording or playing back data as a spot 53-1. The other two laser beams for tracking-servo use are radiated to locations on the outer-circumference and inner-circumference sides of the disk 11a each separated away from the center of the laser beam for detection of data (as well as for detection of a focus error) by one half of the track pitch. In addition, the other two laser beams respectively precede and succeed the laser beam for detection of data as spots 53-2 and 53-3 sandwiching the laser beam for detection of data in the tangential direction of the track.

By doing this, the area in the inner-circumference half of the generated spot 53-2 includes the wobbled edge of the track currently undergoing data recording or data reproduction with the center of the spot 53-2 coinciding with the center of the land. By using half of the area of the spot 53-2, it is possible to further make crosstalk difficult to occur and to reduce the track pitch.

Since the electrical configuration of the optical head 34 employed in the third embodiment is the same as that shown in FIG. 7 except for the fact that the electrical signal output by the light receiving region F of the light receiving unit 48-2 is supplied to the address decoder 5 as a wobbling signal, its explanation is omitted.

It should be noted that the sum (E+F) of the electrical signals output by the light receiving regions E and F of the light receiving unit 48-2 can also be used as a wobbling signal. In this case, the laser beam received by the light receiving unit 48-2 is radiated so as not to hit the wobbled edge of the adjacent groove. If the laser beam received by the light receiving unit 48-2 hits the wobbled edge of the adjacent groove, the amount of crosstalk will increase.

Since the remaining part of the configuration is the same as the first embodiment, its explanation is omitted.

As described above, in the third embodiment, a laser beam for detection of a tracking error is radiated to a disk with each groove thereon having a wobbled edge only on one side thereof by focusing the laser beam on the wobbled edge of a groove currently undergoing a data recording or reproducing operation, and a returned signal is detected for carrying out a tracking servo. At the same time, a wobbling signal representing the wobbling shape of the wobbled edge is detected. The address of a recording or reproducing location is then calculated from the wobbling signal.

Figure 13:
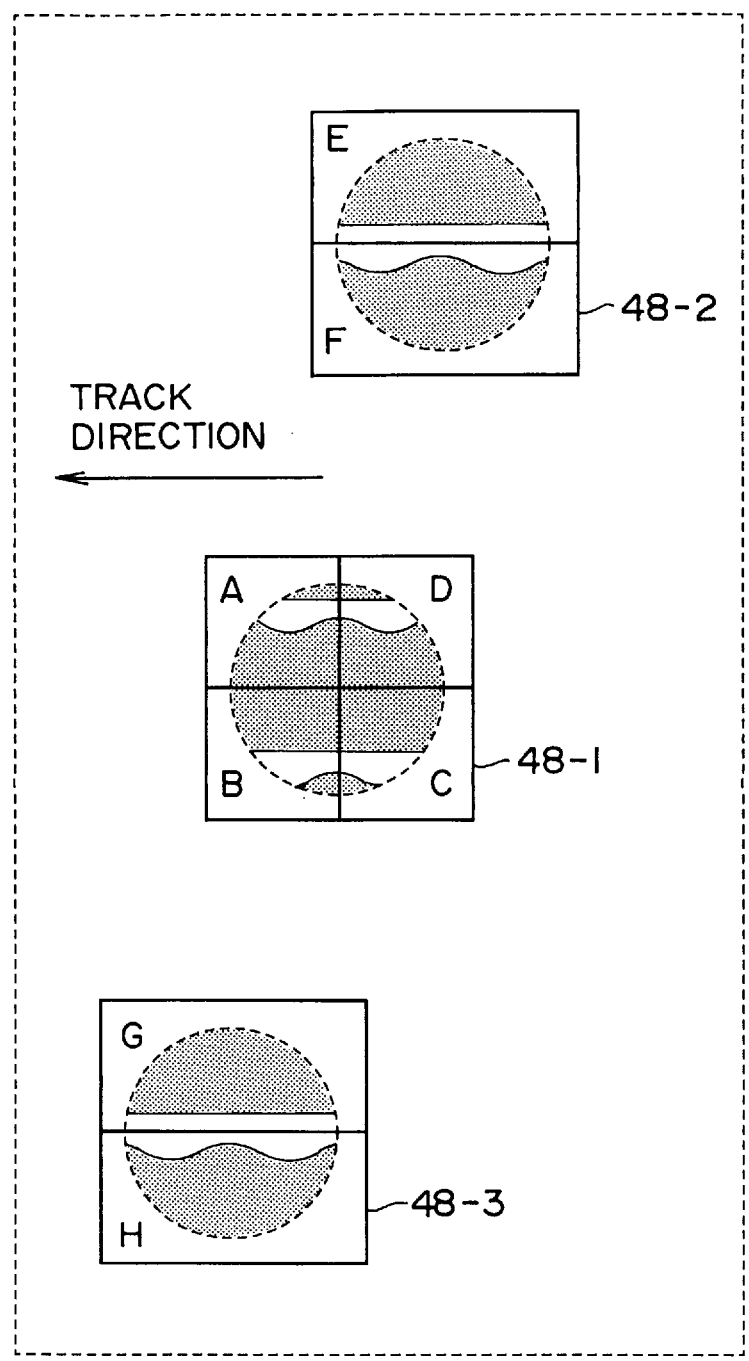
FIG. 13 is a diagram showing an example of spots reflecting returned lights to light receiving units.
Figure 14:
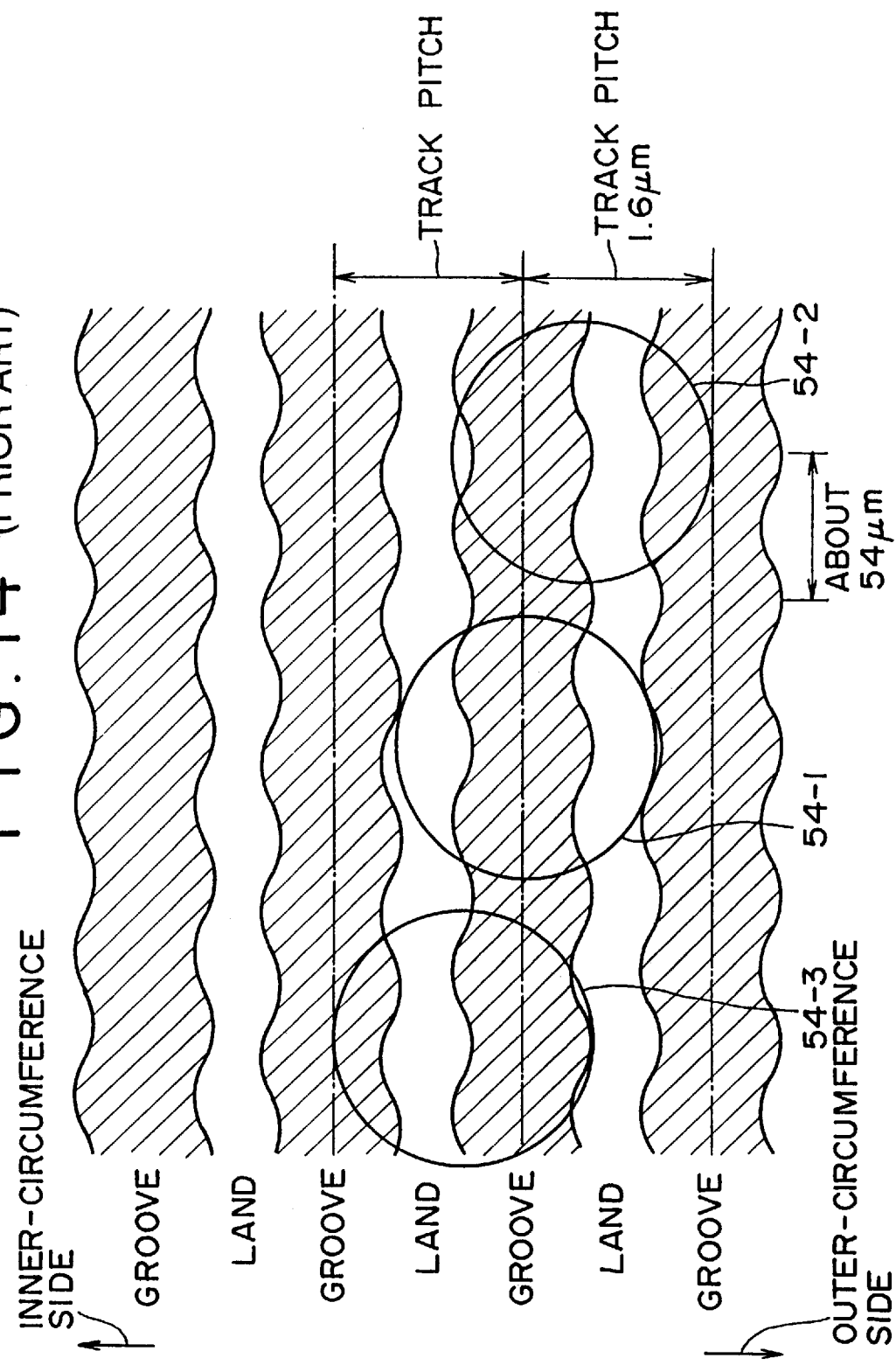
FIG. 14 is a diagram showing a typical configuration seen from the flat surface of a conventional recording medium.
Figure 15:
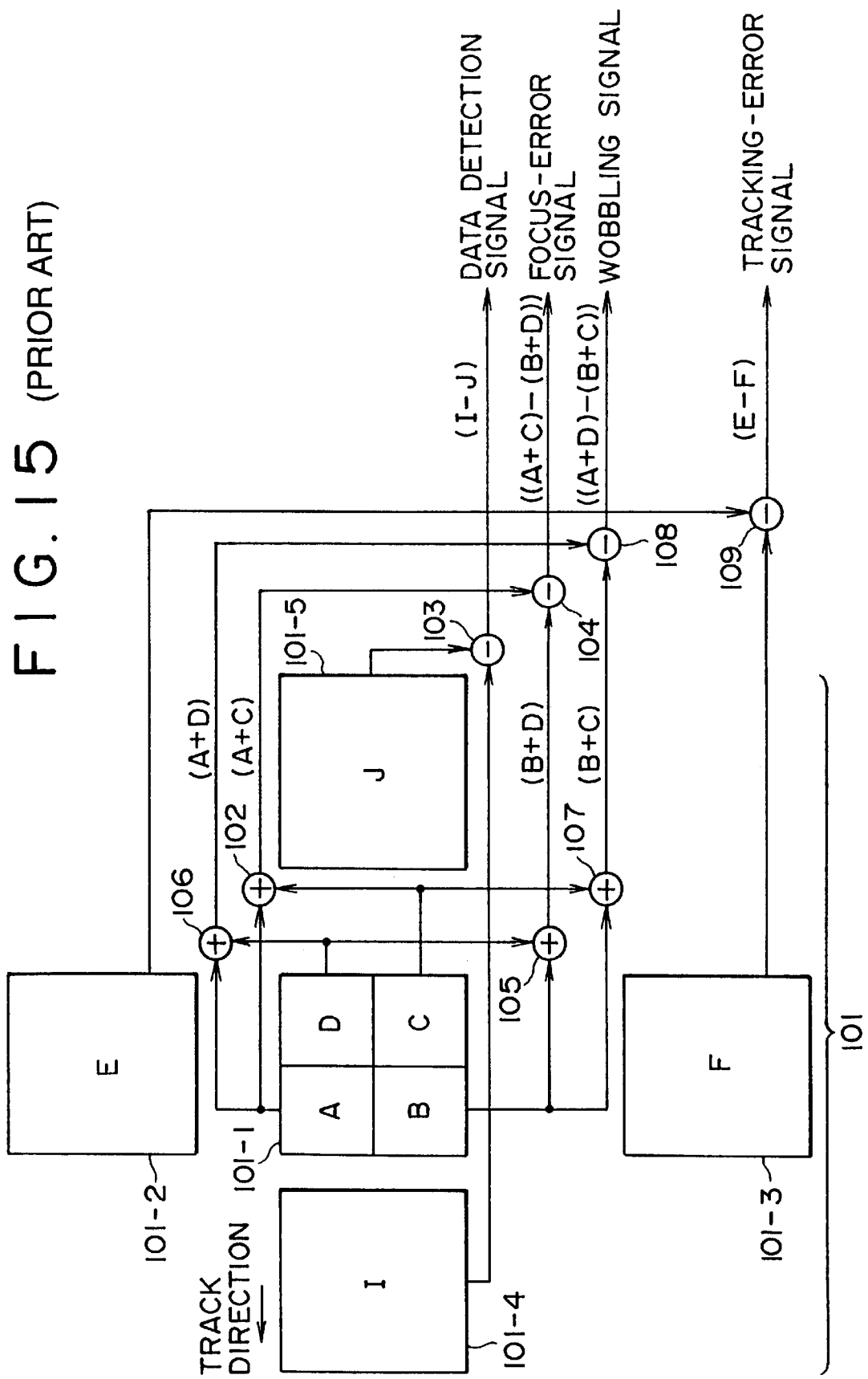
FIG. 15 is a block diagram showing a typical configuration of a circuit employed in the conventional recording/reproducing apparatus for receiving returned lights and converting them into electrical signals.

It is worth noting that, much like the second embodiment, also in the case of the third embodiment, since all the three returned lights pass through the lens 47, the spot patterns at the light receiving units 48-1 to 48-3 are rotated by 90 degrees. Thus, as shown in FIG. 13, the returned light from the outer-circumference half of the spot 52-1 on the disk 11a enters the light receiving regions A and D and the returned light from the outer-circumference half of the spot 52-2 on the disk 11a enters the upper half of the light receiving region E. On the other hand, the returned light from the outer-circumference half of the spot 52-3 on the disk 11a enters the upper half of the light receiving region G. By the same token, the returned light from the inner-circumference half of the spot 52-1 on the disk 11a enters the light receiving regions B and C and the returned light from the inner-circumference half of the spot 52-2 on the disk 11a enters the lower half of the light receiving region F. On the other hand, the returned light from the inner-circumference half of the spot 52-3 on the disk 11a enters the lower half of the light receiving region H.

As described above, a laser beam other than the laser beam for detection of data (that is, a laser beam for detection of a tracking error) is radiated to the edge of a track which has a wobbled shape representing the address information of the track, and the address of a location hit by the laser beam for detection of data is calculated from a returned light thereof. Data is then recorded or played back in accordance with the address information.

It should be noted that, while the present invention has been described with reference to the first to third illustrative embodiments, the description is not intended to be construed in a limiting sense. That is to say, it is to be understood that the subject matter encompassed by the present invention is not limited to the three embodiments. To be more specific, the configurations of the recording media provided by the present invention are not limited to those shown in FIGS. 5 and 9.

What is claimed is:

1. A disk-shaped recording medium for reducing crosstalk between addressing signals of adjacent tracks, said recording medium comprising:

a plurality of lands; and a plurality of grooves laid out alternately with said plurality of lands, wherein one of said plurality of lands and said plurality of grooves includes a plurality of tracks, and the other includes a plurality of non-recording areas, said plurality of tracks being configured to have data recorded thereon or reproduced therefrom, wherein an edge of a groove adjacent to a land is wobbled in accordance with address information of a track, said track on one of said groove and said land, and wherein said plurality of lands and said plurality of grooves have a track pitch in a range of 0.85 to 0.90 microns, said track pitch being a distance between centerlines of adjacent tracks.

2. The recording medium of claim 1, wherein right and left edges of a groove adjacent to a land are wobbled in accordance with address information of a track, said track on one of said groove and said land.

3. The recording medium of claim 1, wherein said plurality of grooves includes said plurality of tracks, and said plurality of lands includes said plurality of non-recording areas.

4. The recording medium of claim 1, wherein said plurality of lands includes said plurality of tracks, and said plurality of grooves includes said plurality of non-recording areas.

5. The recording medium of claim 1, wherein only one of a right edge and a left edge of a groove adjacent to a land is wobbled in accordance with address information of a track, said track on one of said groove and said land.

6. An address recording method for reducing crosstalk between addressing signals of adjacent tracks of a disk-shaped recording medium, said address recording method comprising the steps of:

laying out a plurality of grooves on a disk-shaped recording medium, said grooves alternating with a plurality of lands wherein one of said plurality of lands and said plurality of grooves includes a plurality of tracks, and the other includes a plurality of non-recording areas, said plurality of tracks being configured to have data recorded thereon or reproduced therefrom; and wobbling an edge of a groove adjacent to a land in accordance with address information of a track, said track on one of said groove and said land, wherein said step of laying out lays out said plurality of grooves such that said plurality of lands and said plurality of grooves have a track pitch in a range of 0.85 to 0.90 microns, said track pitch being a distance between centerlines of adjacent tracks.

7. The address recording method of claim 6, wherein said step of wobbling comprises:

wobbling right and left edges of a groove adjacent to a land in accordance with address information of a track, said track on one of said groove and said land.

8. The address recording method of claim 6, wherein said step of laying out comprises:

laying out a plurality of grooves on a disk-shaped recording medium, said grooves alternating with a plurality of lands wherein said plurality of grooves includes a plurality of tracks and said plurality of lands includes a plurality of non-recording areas, said plurality of tracks being configured to have data recorded thereon or reproduced therefrom.

9. The address recording method of claim 6, wherein said step of laying out comprises:

laying out a plurality of grooves on a disk-shaped recording medium, said grooves alternating with a plurality of lands wherein said plurality of lands includes a plurality of tracks and said plurality of grooves includes a plurality of non-recording areas, said plurality of tracks being configured to have data recorded thereon or reproduced therefrom.

10. The address recording method of claim 6, wherein said step of wobbling comprises:

wobbling only one of a right edge and a left edge of a groove adjacent to a land in accordance with address information of a track, said track on one of said groove and said land.

11. The address recording method of claim 6, wherein said step of laying out and said step of wobbling are performed when a recording medium is created from a master disk on which address information was recorded by radiating a laser beam to accomplish said step of laying out and said step of wobbling.

12. An address recording apparatus for reducing crosstalk between addressing signals of adjacent tracks on a disk-shaped recording medium, said address recording apparatus comprising:

means for laying out a plurality of grooves on a disk-shaped recording medium, said grooves alternating with a plurality of lands wherein one of said plurality of lands and said plurality of grooves includes a plurality of tracks, and the other includes a plurality of non-recording areas, said plurality of tracks being configured to have data recorded thereon or reproduced therefrom; and means for wobbling an edge of a groove adjacent to a land in accordance with address information of a track, said track on one of said groove and said land, wherein said means for laying out lays out said plurality of grooves such that said plurality of lands and said plurality of grooves have a track pitch in a range of 0.85 to 0.90 microns, said track pitch being a distance between centerlines of adjacent tracks.

13. The address recording apparatus of claim 12, wherein said means for laying out comprises a laser beam generator.

14. The address recording apparatus of claim 12, wherein said means for wobbling comprises:

means for wobbling right and left edges of a groove adjacent to a land in accordance with address information of a track, said track on one of said groove and said land.

15. The address recording apparatus of claim 12, wherein said means for laying out comprises:

means for laying out a plurality of grooves on a disk-shaped recording medium, said grooves alternating with a plurality of lands wherein said plurality of grooves includes a plurality of tracks and said plurality of lands includes a plurality of non-recording areas, said plurality of tracks being configured to have data recorded thereon or reproduced therefrom.

16. The address recording apparatus of claim 12, wherein said means for laying out comprises:

means for laying out a plurality of grooves on a disk-shaped recording medium, said grooves alternating with a plurality of lands wherein said plurality of lands includes a plurality of tracks and said plurality of grooves includes a plurality of non-recording areas, said plurality of tracks being configured to have data recorded thereon or reproduced therefrom.

17. The address recording apparatus of claim 12, wherein said means for wobbling comprises:

means for wobbling only one of a right edge and a left edge of a groove adjacent to a land in accordance with address information of a track, said track on one of said groove and said land.

18. A recording/reproducing method for recording data onto or reproducing data from a disk-shaped recording medium having a plurality of lands and a plurality of grooves laid out alternately with said plurality of lands, wherein one of said plurality of lands and said plurality of grooves includes a plurality of tracks, and the other includes a plurality of non-recording areas, said plurality of tracks being configured to have data recorded thereon or reproduced therefrom, wherein an edge of a groove adjacent to a land is wobbled in accordance with address information of a track, said track on one of said groove and said land, said recording/reproducing method comprising the steps of:

radiating a first beam for recording data on or reproducing data from a track on a disk-shaped recording medium, and radiating a second beam on an edge of a non-recording area adjacent to said track by focusing said second beam on said non-recording area such that said second beam hits only a desired edge of a plurality of edges on said recording medium having a track pitch in a range of 0.85 to 0.90 microns, said track pitch being a distance between centerlines of adjacent tracks;

detecting a reflected light of said second beam reflected from said recording medium; and computing from said reflected light an address of a location hit by said first radiated beam.

19. The recording/reproducing method of claim 18, further comprising the step of:

computing from said reflected light a tracking error signal.

20. The recording/reproducing method of claim 18, wherein said second beam is one of side beams used in a tracking servo adopting a differential push-pull method and radiated to a location separated away from a centerline of said track by a distance in a radial direction of one half of said track pitch.

21. The recording/reproducing method of claim 18, wherein said second beam is one of side beams used in a tracking servo adopting a differential push-pull method and radiated to a location separated away from a centerline of said track by a distance in a radial direction of one quarter of said track pitch.

22. The recording/reproducing method of claim 18, wherein right and left edges of a groove adjacent to a land are wobbled in accordance with address information of a track, said track on one of said groove and said land, wherein said step of radiating comprises:

radiating a first beam for recording data on or reproducing data from a track on a disk-shaped recording medium, and radiating a second beam on right and left edges of a non-recording area adjacent to said track by focusing said second beam on said non-recording area such that said second beam hits only desired right and left edges of a plurality of edges on said recording medium having a track pitch in a range of 0.85 to 0.90 microns, said track pitch being a distance between centerlines of adjacent tracks.

23. A recording/reproducing apparatus for recording data onto or reproducing data from a disk-shaped recording medium having a plurality of lands and a plurality of grooves laid out alternately with said plurality of lands, wherein one of said plurality of lands and said plurality of grooves includes a plurality of tracks, and the other includes a plurality of non-recording areas, said plurality of tracks being configured to have data recorded thereon or reproduced therefrom, wherein an edge of a groove adjacent to a land is wobbled in accordance with address information of a track, said track on one of said groove and said land, said recording/reproducing apparatus comprising:

means for radiating a first beam for recording data on or reproducing data from a track on a disk-shaped recording medium, and radiating a second beam on an edge of a non-recording area adjacent to said track by focusing said second beam on said non-recording area such that said second beam hits only a desired edge of a plurality of edges on said recording medium having a track pitch in a range of 0.85 to 0.90 microns, said track pitch being a distance between centerlines of adjacent tracks;

means for detecting a reflected light of said second beam reflected from said recording medium; and means for computing from said reflected light an address of a location hit by said first radiated beam.

24. The recording/reproducing method of claim 23, further comprising:

means for computing from said reflected light a tracking error signal.

25. The recording/reproducing method of claim 23, wherein said second beam is one of side beams used in a tracking servo adopting a differential push-pull method and radiated to a location separated away from a centerline of said track by a distance in a radial direction of one half of said track pitch.

26. The recording/reproducing method of claim 23, wherein said second beam is one of side beams used in a tracking servo adopting a differential push-pull method and radiated to a location separated away from a centerline of said track by a distance in a radial direction of one quarter of said track pitch.

27. The recording/reproducing method of claim 23, wherein right and left edges of a groove adjacent to a land are wobbled in accordance with address information of a track, said track on one of said groove and said land, wherein said means for radiating comprises:

means for radiating a first beam for recording data on or reproducing data from a track on a disk-shaped recording medium, and radiating a second beam on right and left edges of a non-recording area adjacent to said track by focusing said second beam on said non-recording area such that said second beam hits only desired right and left edges of a plurality of edges on said recording medium having a track pitch in a range of 0.85 to 0.90 microns, said track pitch being a distance between centerlines of adjacent tracks.

* * * * *